US012344250B2

(12) United States Patent
Terazawa

(10) Patent No.: US 12,344,250 B2
(45) Date of Patent: Jul. 1, 2025

(54) VEHICLE POSITION ESTIMATION DEVICE AND TRAVELING CONTROL DEVICE

(71) Applicant: DENSO CORPORATION, Kariya (JP)

(72) Inventor: Tomohito Terazawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 256 days.

(21) Appl. No.: 18/150,104

(22) Filed: Jan. 4, 2023

(65) Prior Publication Data

US 2023/0147535 A1 May 11, 2023

Related U.S. Application Data

(63) Continuation of application No. PCT/JP2021/025363, filed on Jul. 5, 2021.

(30) Foreign Application Priority Data

Jul. 7, 2020 (JP) ................................ 2020-117248

(51) Int. Cl.
  *B60W 30/18* (2012.01)
  *B60W 60/00* (2020.01)
  *G06V 20/56* (2022.01)
(52) U.S. Cl.
  CPC .... *B60W 30/18163* (2013.01); *B60W 60/001* (2020.02); *G06V 20/56* (2022.01); *B60W 2420/403* (2013.01); *B60W 2555/20* (2020.02)
(58) Field of Classification Search
  CPC ....... B60W 30/18163; B60W 60/0018; B60W 60/00182; B60W 2420/403; B60W 2555/20; G06V 20/56
  See application file for complete search history.

(56) References Cited

U.S. PATENT DOCUMENTS

| 2016/0305794 | A1  | 10/2016 | Horita et al. |
| 2017/0161567 | A1  | 6/2017  | Satomura |
| 2019/0152477 | A1* | 5/2019  | Salter ................... B60W 10/18 |
| 2019/0243382 | A1* | 8/2019  | Takaki ............... G01C 21/3691 |
| 2020/0003563 | A1  | 1/2020  | Miyake et al. |

(Continued)

FOREIGN PATENT DOCUMENTS

| JP | 2007-147564 A | 6/2007 |
| JP | 2008-006878 A | 1/2008 |

(Continued)

OTHER PUBLICATIONS

U.S. Appl. No. 18/150,094 and its entire file history, filed Jan. 4, 2023, Masato Miyake.

*Primary Examiner* — Hussein Elchanti
*Assistant Examiner* — Kenneth M Dunne
(74) *Attorney, Agent, or Firm* — Maschoff Brennan

(57) ABSTRACT

A vehicle position estimation device includes a control unit configured to: specify a vehicle position on a map based on (i) position information of a landmark detected based on an image frame captured by a front camera and (ii) position information of the landmark registered in the map; determine whether a surrounding environment of the vehicle is an adverse environment based on at least one of (i) information output from a sensor equipped to the vehicle or (ii) information output from a communication device equipped to the vehicle. The control unit changes a content of process corresponding to a determination result of adverse environment.

18 Claims, 9 Drawing Sheets

(56) References Cited

U.S. PATENT DOCUMENTS

| | | |
|---|---|---|
| 2020/0003567 A1 | 1/2020 | Minamiguchi et al. |
| 2020/0020126 A1 | 1/2020 | Kitago et al. |
| 2020/0064839 A1 | 2/2020 | Oyama |
| 2020/0189587 A1* | 6/2020 | Imai .................... B60W 30/162 |
| 2020/0231182 A1 | 7/2020 | Oba |
| 2021/0101616 A1* | 4/2021 | Hayat .................. G06V 10/764 |
| 2021/0180979 A1 | 6/2021 | Kitahara |
| 2021/0264781 A1* | 8/2021 | Jang ........................ G06F 18/25 |

FOREIGN PATENT DOCUMENTS

| | | |
|---|---|---|
| JP | 2011-108175 A | 6/2011 |
| JP | 2016-011031 A | 1/2016 |
| JP | 2017-102831 A | 6/2017 |
| JP | 2020-038359 A | 3/2020 |

\* cited by examiner

RETURN TO TRAVELING LANE DUE TO ADVERSE WEATHER/ROAD SURFACE STATE.
(START LANE CHANGE 5 SECONDS LATER)

START MANUAL DRIVING IF CONTINUE OVERTAKING.

VEHICLE POSITION ESTIMATION DEVICE AND TRAVELING CONTROL DEVICE

CROSS REFERENCE TO RELATED APPLICATIONS

The present application is a continuation application of International Patent Application No. PCT/JP2021/025363 filed on Jul. 5, 2021, which designated the U.S. and claims the benefit of priority from Japanese Patent Application No. 2020-117248 filed on Jul. 7, 2020. The entire disclosures of all of the above applications are incorporated herein by reference.

TECHNICAL FIELD

The present disclosure relates to a vehicle position estimation device, which estimates a position of a vehicle using image frame captured by a front camera, and also relates to a traveling control device using the vehicle position estimation device.

BACKGROUND

There has been known a technique for specifying a vehicle position based on an observation position of a landmark specified based on an image captured by a front camera and position coordinates of the same landmark registered in map data.

SUMMARY

The present disclosure provides a vehicle position estimation device. The vehicle position estimation device: specifies a vehicle position on a map based on (i) position information of a landmark detected based on an image frame captured by a front camera and (ii) position information of the landmark registered in the map; and determines whether a surrounding environment of the vehicle is an adverse environment based on at least one of (i) information output from a sensor equipped to the vehicle or (ii) information output from a communication device equipped to the vehicle. The vehicle position estimation device changes a content of process corresponding to a determination result of adverse environment.

BRIEF DESCRIPTION OF DRAWINGS

Objects, features and advantages of the present disclosure will become apparent from the following detailed description made with reference to the accompanying drawings. In the drawings.

DETAILED DESCRIPTION

Figure 1:
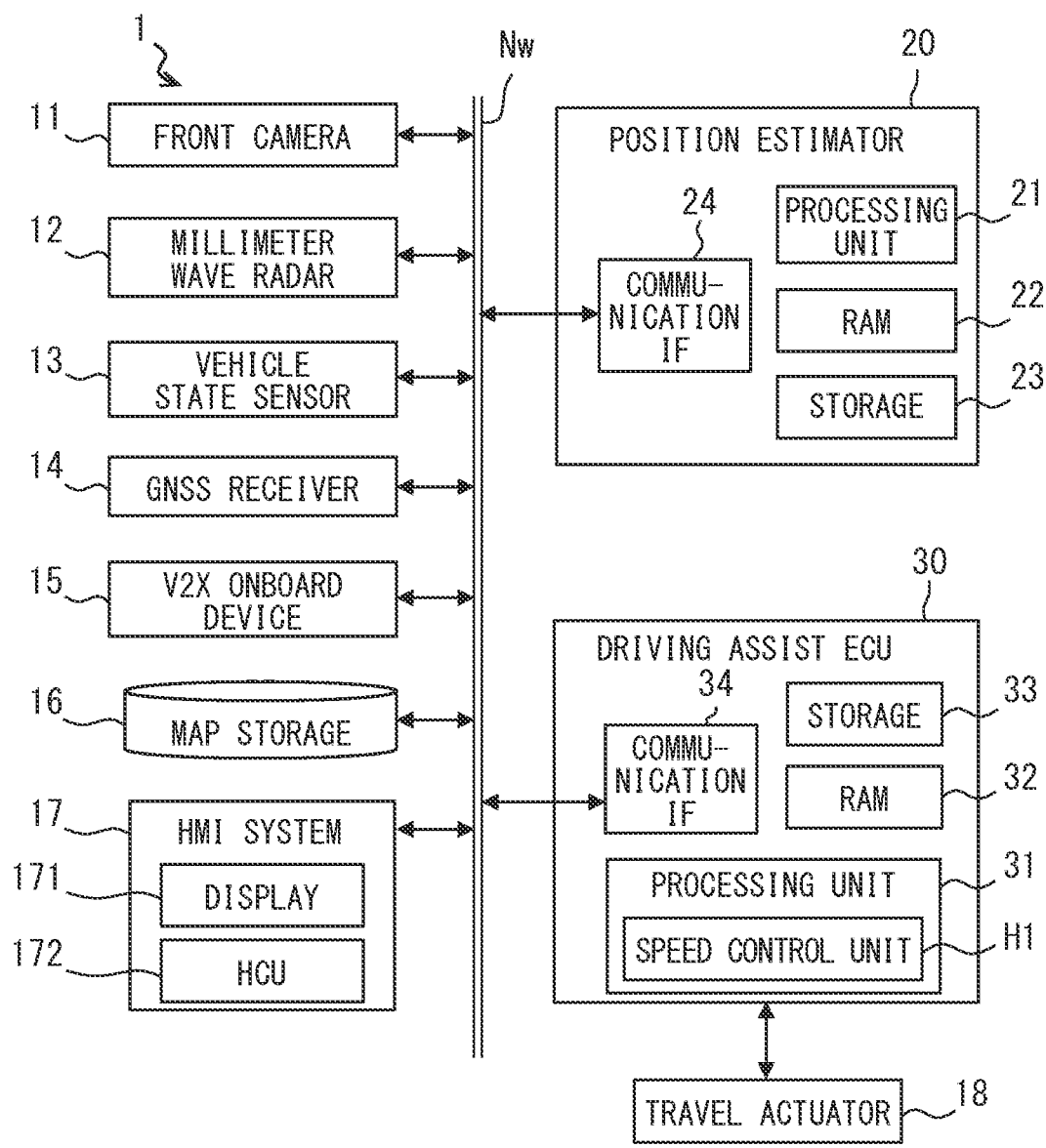
FIG. 1 is a block diagram showing a configuration of a driving assist system.

In a vehicle traveling control, it is required to specify a vehicle position with higher accuracy for perform traveling control, such as autonomous driving of a vehicle or an automobile. For example, as a technique for specifying a vehicle position with higher accuracy, there has been known a technique for specifying a vehicle position based on an observation position of a landmark specified based on an image captured by a front camera and position coordinates of the same landmark registered in map data. A process of specifying the vehicle position by comparing (that is, matching) a recognition result of an image captured by a front camera and map data as described above is also referred to as a localization process.

The localization process is based on the premise that the front camera can accurately recognize the landmark. However, under an adverse environment, such as rainfall or dense fog, the camera image becomes blurred, and a recognition success rate of the landmark may be decreased. In particular, when the landmark is located at a distant position, it is more difficult to recognize the landmark.

When the image recognition of landmark becomes difficult, a frequency (success rate) of vehicle position specification by the localization process also decreases. As a result, an estimation accuracy of vehicle position also deteriorates. Since an estimation accuracy of the vehicle position greatly contributes to a safety of autonomous driving, a vehicle position estimation device is required to have a high robust against the adverse environment.

According to an aspect of the present disclosure, a vehicle position estimation device, which is mounted on a vehicle and estimates a current vehicle position, includes a control unit configured by at least one processor. The control unit includes: a localization unit performing a process for specifying a position of the vehicle on a map based on (i) position information of a landmark detected based on an image frame captured by a front camera and (ii) position information of the landmark registered in the map; and an adverse environment determination unit determining whether a surrounding environment of the vehicle is an adverse environment based on at least one of (i) information output from a sensor equipped to the vehicle or (ii) information output from a communication device equipped to the vehicle, the adverse environment causing a deterioration in an accuracy of object recognition that is performed using the image frame.

When the vehicle does not travel in an overtaking lane or an acceleration lane, the control unit outputs, to a vehicle control module that automatically controls a traveling speed of the vehicle, a deceleration request signal to restrict the traveling speed of the vehicle in response to the adverse environment determination unit determining that the surrounding environment of the vehicle is the adverse environment. When the vehicle travels in an overtaking lane or an acceleration lane, the control unit cancels output of the deceleration request signal in response to the adverse environment determination unit determining that the surrounding environment of the vehicle is the adverse environment.

According to the above configuration, when the surrounding environment is determined to be an adverse environment, a different process is executed from which executed when the surrounding environment is not determined to be the adverse environment (that is, in normal environment). Thus, with consideration of the adverse environment, the process executed in the adverse environment can have contents which are different from that executed in the normal environment. As a result, it is possible to improve robustness compared to a comparative configuration in which a fixed process is executed regardless of whether the environment is adverse or not.

According to another aspect of the present disclosure, a traveling control device, which is mounted on a vehicle and automatically performs a speed control of the vehicle, includes a control unit configured by at least one processor. The control unit includes: a speed control unit outputting, to a traveling actuator of the vehicle, a control signal that controls a traveling speed of the vehicle; a localization unit specifying a position of the vehicle on a map based on (i) position information of a landmark specified based on an image frame generated by a front camera and (ii) position information of the landmark registered in the map; and an adverse environment determination unit determining whether a surrounding environment of the vehicle is an adverse environment based on at least one of (i) information output from a sensor equipped to the vehicle or (ii) information output from a communication device equipped to the vehicle, the adverse environment causing a deterioration in an accuracy of object recognition that is performed using the image frame. When the vehicle does not travel in an overtaking lane, the control unit executes a process to restrict a traveling speed of the vehicle in response to the adverse environment determination unit determining that the surrounding environment of the vehicle is the adverse environment. When the vehicle travels in the overtaking lane, the control unit starts a process that controls the vehicle to cancel overtaking and move from the overtaking lane to a traveling lane.

According to the above traveling control device, in the adverse environment, the traveling speed is suppressed by an amount greater than a suppression amount of traveling speed in the normal environment. In general, the image captured by the camera has a lower visibility with an increase of the traveling speed. In other words, it can be expected that the visibility of image is enhanced by suppressing the traveling speed of vehicle. When the visibility of image is increased, the detection accuracy of the landmark by the image recognition is increased, accordingly. With the above configuration, it is possible to suppress degradation in detection accuracy of the landmark even in the adverse environment. At the same time, it is expected that the success rate of the localization process will be increased. As described above, in the localization process, the position coordinates of the vehicle on the map are specified with reference to the position information of a predetermined landmark that is specified by using an image captured by the front camera. As a result, with the above configuration, it is possible to improve robustness against the adverse environment.

The following will describe embodiments of the present disclosure with reference to the drawings. FIG. 1 is a diagram showing an example of a schematic configuration of a driving assist system 1 to which a position estimator of the present disclosure is applied.

(Overview of Overall Configuration)

As shown in FIG. 1, the driving assist system 1 includes a front camera 11, a millimeter wave radar 12, a vehicle state sensor 13, a GNSS receiver 14, a V2X onboard device 15, a map storage 16, an HMI system 17, a position estimator 20, and a driving assist ECU 30. The ECU used in the above-described component name is an abbreviation for electronic control unit, and indicates an electronic control device. The HMI is an abbreviation for human machine interface. The V2X is an abbreviation for vehicle to x (everything) and refers to a communication technology that connects various things to a vehicle.

The various devices or sensors included in the driving assist system 1 are connected to an in-vehicle network Nw as nodes. The in-vehicle network Nw is a communication network built in the vehicle. The nodes connected to the in-vehicle network Nw can communicate with one another. Specific devices may be configured to be able to communicate directly with one another without communicating through the in-vehicle network Nw. For example, the position estimator 20 may be electrically connected in direct manner by a dedicated line with the driving assist ECU 30. Although the in-vehicle network Nw is configured as a bus type as shown in FIG. 1, the configuration of the in-vehicle network is not limited to the exemplary configuration shown in FIG. 1. A network topology of the in-vehicle network may be a mesh type, a star type, a ring type, or the like. A network format of the in-vehicle network can be changed as appropriate. The in-vehicle network Nw may adopt various network standards, such as controller area network (hereinafter referred to as CAN, registered trademark), Ethernet (registered trademark), FlexRay (registered trademark).

Hereinafter, a vehicle on which the driving assist system 1 is mounted is also described as a subject vehicle, and an occupant seated in a driver's seat of the subject vehicle (also referred to as occupant in the driver seat) is also referred to as a user. In the following description, a front-rear direction, a lateral direction, and an up-down direction are defined with reference to the subject vehicle. Specifically, the front-rear direction corresponds to a longitudinal direction of the subject vehicle. The lateral direction corresponds to a width direction of the subject vehicle. The up-down direction corresponds to a vehicle height direction. From another point of view, the up-down direction corresponds to a direction perpendicular to a plane parallel to the front-rear direction and the lateral direction.

In the following description, an example in which the driving assist system 1 is used in a left-hand traffic country or left-hand traffic area will be described. Under left-hand traffic, a leftmost lane among the lanes defining the same traveling direction is referred to as a first lane. When the devices according to the present disclosure are used in a right-hand traffic country or right-hand traffic area, the configuration of the present disclosure can be achieved by reversing the above-described elements related to right and the elements related to left. For example, in the right-hand traffic area, the first lane indicates a rightmost lane among the lanes defining the same traveling direction. The driving assist system 1 described below can be changed to conform to traffic regulations or customs of an area where the driving assist system 1 is used.

(Overview of Each Component)

Figure 2:
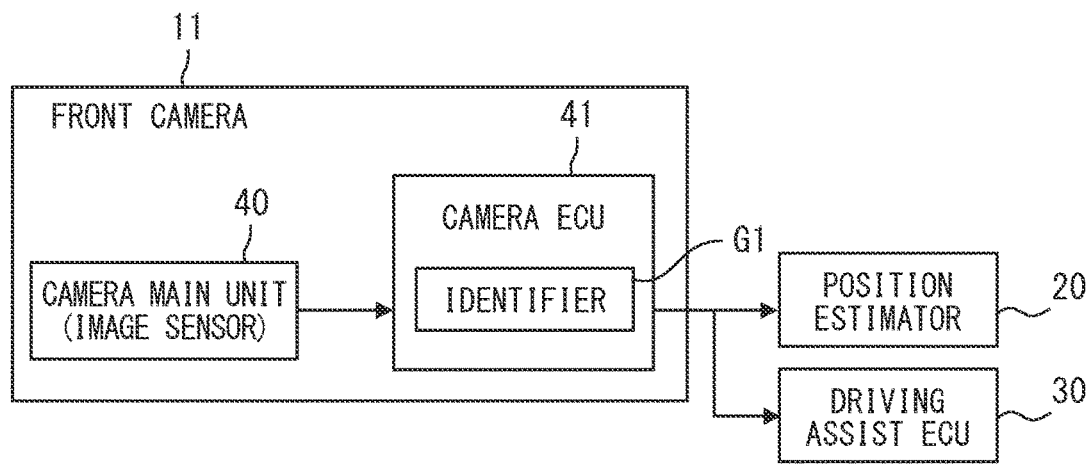
FIG. 2 is a block diagram showing a configuration of a front camera.

The front camera 11 captures images of a front area of vehicle at a predetermined angle of view. The front camera 11 is disposed, for example, at an upper end portion of a front windshield in a vehicle compartment, a front grille, or a roof top. As shown in FIG. 2, the front camera 11 includes a camera main unit 40, which generates an image frame, and a camera ECU 41. The camera ECU 41 detects a predetermined detection target by performing a recognition process on the captured image frame. The camera main unit 40 at least includes an image sensor and a lens. The camera main unit 40 generates and outputs captured image data at a predetermined frame rate (for example, 60 fps). The camera ECU 41 is implemented by an image processing circuit. The image processing circuit may include a central processing unit (CPU), a graphic processing unit (GPU), or the like. The camera ECU 41 includes an identifier G1 as a functional block. The identifier G1 identifies a type of a captured object based on a feature amount vector of the image generated by the camera main unit 40. The identifier G1 may identify an object by using, for example, convolutional neural network (CNN) or deep neural network (DNN), to each of which deep learning is applied.

A detection object of the front camera 11 may include, for example, a moving object, such as pedestrians or different vehicles. The different vehicle may include a bicycle, a motorized bicycle, or a motorcycle. The front camera 11 is configured to detect a predetermined planimetric feature. The planimetric feature to be detected by the front camera 11 may include a road edge, a road marking, and a structure installed along the roadside. The road marking is a marking that is painted on a road surface for traffic control and traffic regulation purpose. For example, the road marking may include a lane boundary line (also known as a lane marker) indicating a lane boundary, a pedestrian crossing, a stop line, a buffer zone, a safety zone, and a regulatory arrow. The lane boundary line may include road studs, such as chatter bars and Botts' dots. The structure installed along the roadside may include guardrails, curbs, trees, electric poles, traffic signs, or traffic lights.

The front camera 11 detects an obstacle such as an animal, a fallen tree, and an object fallen from a different vehicle. The obstacle here indicates a three-dimensional object, which exists on the road and obstructs traffic on the road. The fallen object may be, for example, a box, a ladder, a bag, or the like. The obstacle may include a tire fallen off from a different vehicle, an accident vehicle, debris fallen from the accident vehicle, or the like. The obstacle may include a regulation equipment for lane regulation purpose, such as an arrow board, a cone, a guide board. The obstacle may also include a construction site, a parked vehicle, and an end of a traffic congestion. The obstacle may include a semi-static map element in addition to a static object that obstructs traffic on the road. For example, the front camera 11 may specify a type of the obstacle, such as a fallen object by an image recognition, and output the specified object type. The front camera 11 may be configured to specify not only the obstacle existing on the traveling lane of the subject vehicle, but also an obstacle existing in a region corresponding to an adjacent traveling lane of the subject vehicle. For example, the front camera 11 may be configured to detect an obstacle existing on the traveling lane of the subject vehicle and an obstacle existing on a traveling lane located on right or left side of the traveling lane of the subject vehicle.

The camera ECU 41 separately extracts, from the captured image, a background and detection objects based on image information including information about color, brightness, contrast related to color and brightness, and the like. A part or all of the planimetric features, which correspond to detection targets of the front camera 11, are used as landmarks by the position estimator 20. The landmark in the present disclosure refers to a planimetric feature that can be used as a mark for specifying the position of the subject vehicle on the map. It is possible to adopt at least one of a signboard of traffic sign, a traffic light, a pole, or an information plate as the landmark. The traffic sign may include a regulation sign, a guide sign, a warning sign, an instruction sign, or the like. The guide sign may include a direction signboard, a signboard indicating an area name, a signboard indicating a road name, a notice signboard for announcing a gateway of an expressway, a notice signboard for announcing a service area, or the like. The landmark may include a streetlight, a mirror, a utility pole, a commercial advertisement signboard, a signboard indicating a store name, an iconic building such as a historic building, or the like. The pole may include a streetlight or a utility pole. The landmark may include an uneven portion or a cave-in portion of a road, a manhole, a joint portion, or the like. An end point or a branch point of the lane boundary line may be used as the landmark. It is possible to change the type of planimetric features used as the landmark as appropriate. The landmark may adopt a planimetric feature, which almost has no change over time and has a sufficiently large size to be recognizable from a distance of 100 meters or farther. For example, the landmark may adopt a traffic light or a direction signboard. The landmark may also include a road edge a lane boundary line, or the like.

Among the landmarks, a planimetric feature that can be used as a mark for estimating a position in the longitudinal direction of the vehicle (hereinafter referred to as longitudinal position estimation) is also referred to as a landmark for longitudinal position estimation purpose. The longitudinal direction corresponds to the front-rear direction of the vehicle. The longitudinal direction also corresponds to a road extension direction, which corresponds to a direction in which the road extends when viewed from the subject vehicle, within a straight road segment. As the landmark for longitudinal position estimation purpose, it is possible to adopt map elements that are discretely disposed along the roadside and almost have no change over time. For example, a traffic sign, such as a direction signboard, a road surface marking, such as a stop line may be adopted as the landmark. Among the landmarks, a planimetric feature that can be used as a mark for estimating a position in the lateral direction of the vehicle (hereinafter referred to as lateral position estimation) is also referred to as a landmark for lateral position estimation purpose. The lateral direction here corresponds to a width direction of the road. The landmark for lateral position estimation purpose may be provided by a planimetric feature that is located continuously along the road, such as a road edge or a lane boundary line. The front camera 11 may be configured to detect a planimetric feature having a type set as the landmark.

The camera ECU 41 calculates a relative distance from the subject vehicle to the planimetric feature and a direction of the planimetric feature relative to the subject vehicle from an image including structure from motion (SfM) information. The planimetric feature may be provided by the landmark or the lane boundary line. A relative position (the relative distance and the relative direction) of the planimetric feature relative to the subject vehicle may be specified based on a size and a posture (for example, an inclination level) of the planimetric feature shown in the image. The camera ECU 41 may specify a type of landmark based on a color, a size, or a shape of the landmark. For example, the camera ECU may determine whether the landmark is a direction signboard or not.

The camera ECU 41 generates traveling road data indicating a shape of the traveling road, such as curvature or width, based on the positions and shapes of the lane boundary lines and the road edge. The camera ECU 41 calculates a yaw rate based on the SfM. The camera ECU 41 sequentially provides, to the position estimator 20 and the driving assist ECU 30, detection result data indicating relative position and type of detected object via the in-vehicle network Nw. Hereinafter, "position estimator 20 or the like" indicates at least one of the position estimator 20 or the driving assistance ECU 30.

The camera ECU 41 of the present embodiment may also output data indicating a reliability of recognition result of the image. For example, the reliability of recognition result may be calculated based on an amount of rainfall, a presence or absence of backlight, a brightness of an external environment, or the like. The reliability of recognition result may be provided by a score, which indicates a matching level of the feature amount. As another example, the reliability may be provided by a probability value indicating a probability of the image recognition result. The probability may be output by the identifier G1 as the identification result. The probability value may correspond to the matching level of the feature amount described above. The reliability of recognition result may be an average value of the probability values generated, by the identifier G1, corresponding to respective detected objects.

The camera ECU 41 may evaluate the reliability of recognition result based on a stability of an identification result corresponding to the same object being tracked. For example, the reliability may be evaluated as high when the identification result of the same-type object is stable, and the reliability may be evaluated as low when the identification result of the same-type object is unstable. A state in which the identification result is stable refers to a state in which the same results are successively obtained for a predetermined period, for example, 10 seconds. A state in which the identification result is unstable refers to a state in which the same results are not obtained successively, such as the identification results are changed over and over again.

The millimeter wave radar 12 detects a relative position and a relative speed of the object with respect to the subject vehicle by transmitting millimeter waves or quasi-millimeter waves toward the front direction of vehicle and analyzing reception data of the reflected waves returned after the transmission waves are reflected on the object. The millimeter wave radar 12 corresponds to an object detector in the present disclosure. For example, the millimeter wave radar 12 may be installed to a front grille or a front bumper. The millimeter wave radar 12 includes a radar ECU that identifies the type of detected object based on a size of the detected object, a traveling speed of the detected object, and a signal reception strength reflected on the detected object. The millimeter wave radar 12 is capable of detecting a part or all of the obstacles described above. For example, the millimeter wave radar 12 determines a state of the obstacle based on a position of the detected object, a traveling speed of the detected object, a size of the detected object, and a reflection intensity of the detection object. For example, the type of obstacle may be roughly specified based on the size of detected object or the signal reception strength of the reflected waves. As a detection result, the radar ECU outputs, to the position estimator 20 or the like, data indicating the type of detected object, the relative position (direction and distance) of detected object, and the reception strength of detected object. A detection target object of the millimeter wave radar 12 may include the above-mentioned landmark.

The front camera 11 and the millimeter wave radar 12 may be configured to provide the observation data used for object recognition to the driving assist ECU 30 via the in-vehicle network Nw. For example, the observation data of the front camera 11 refers to the image frames. The observation data of the millimeter wave radar may refer to the data indicating the detection direction, reception strength corresponding to the distance, and the relative speed. The observation data of the millimeter wave radar may refer to data indicating the relative position of the detected object and the signal reception strength of the detected object. The observation data is unprocessed data observed by the sensor, or data before recognition process is executed.

The object recognition process may be executed based on the observation data by, for example, an external ECU other than a built-in ECU of the sensor, such as the driving assist ECU 30. The landmark information acquisition unit F3 may calculate the relative position of the landmark. A part of the functions (mainly the object recognition function) of the camera ECU 41 and the millimeter wave radar 12 may be provided by the position estimator 20 or the driving assist ECU 30. In this case, the camera, which is used as the front camera 11, or the millimeter wave radar may be configured to provide, to the position estimator 20 or the driving assist ECU 30, the observation data such as image data and distance measurement data as detection result data.

The vehicle state sensor 13 detects a state amount related to a traveling control of the subject vehicle. The vehicle state sensor 13 may include an inertial sensor provided by a three-axis gyro sensor and a three-axis acceleration sensor. The driving assist system 1 may include a magnetic sensor as the vehicle state sensor 13. The driving assist system 1 may include an atmospheric pressure sensor and a temperature sensor as the vehicle state sensor 13. The atmospheric pressure sensor and the temperature sensor can also be used for correcting output values of other sensors. The inertial sensor may be packaged as an inertial measurement unit (IMU).

The vehicle state sensor 13 may also include a shift position sensor, a steering angle sensor, a vehicle speed sensor, or the like. The shift position sensor detects a shift position of a shift lever. The steering angle sensor detects a rotation angle of the steering wheel of vehicle, which is also known as a steering angle. The vehicle speed sensor detects a travelling speed of the subject vehicle. The three-axis acceleration sensor detects respective accelerations applied to the subject vehicle in the front-rear direction, the lateral direction, and the up-down direction. The gyro sensor detects a rotation angular velocity around a detection axis, and the three-axis gyro sensor has three detection axes perpendicular to one another. The inertial sensor detects a physical state amount that indicates a behavior of the vehicle. The behavior of vehicle is produced as a result of the driving operation of the occupant in the driver seat or the control by the driving assist ECU 30.

The vehicle state sensor 13 outputs, to the in-vehicle network Nw, data indicating a current value of physical state quantity to be detected (that is, a detection result. The position estimator 20 acquires the output data output from the vehicle state sensor 13 via the in-vehicle network Nw. A type of the sensor used by the driving assist system 1 as the vehicle state sensor 13 may be appropriately designed, and it is not necessary to include various type of sensors as described above. The vehicle state sensor 13 may include a rain sensor that detects rainfall or an illuminance sensor that detects external environment brightness.

The GNSS receiver 14 is a device that sequentially detects a current position of the GNSS receiver 14 by receiving a navigation signal transmitted from a positioning satellite included in a global navigation satellite system (GNSS). As the GNSS, a global positioning system (GPS), a GLONASS, a Galileo, an IRNSS, a QZSS, a Beidou, or the like may be adopted.

The V2X onboard device 15 enables the subject vehicle to perform a wireless communication with another device, and corresponds to a communication device in the present disclosure. The "V" of V2X refers to an automobile as the subject vehicle, and the "X" refers to various objects other than the subject vehicle, such as a pedestrian, a different vehicle, a road facility, a network, or a server. The V2X onboard device 15 includes a wide area communication unit and a short range communication unit as communication modules. The wide area communication unit is a communication module for executing wireless communication compliant with a predetermined wide area wireless communication standard. As the wide area wireless communication standard here, various standards, such as long term evolution (LTE), 4G, or 5G, can be adopted. The wide area communication unit may be configured to execute wireless communication directly with other devices without going through a base station using a communication method compliant with the wide area wireless communication standard, in addition to a communication via a wireless base station. That is, the wide area communication unit may be configured to execute cellular V2X. The subject vehicle may be a connected car that can be connected to the Internet by mounting the V2X onboard device 15. For example, the position estimator 20 can download latest high accuracy map data from a predetermined server in cooperation with the V2X onboard device 15, and update the map data stored in the map storage 16.

The short range communication unit included in the V2X onboard device 15 is a communication module that executes a wireless communication directly with other moving objects or a roadside device existing around the subject vehicle under a short range communication standard, which has a communication range within several hundreds of meters. Other moving objects are not limited to the vehicles, and may include the pedestrian, the bicycle, or the like. As the short range communication standard, such as a dedicated short range communications (DSRC) standard can be adopted appropriately. For example, the short range communication unit broadcasts vehicle information on the subject vehicle to surrounding vehicles at a predetermined transmission cycle, and receives the vehicle information transmitted from different vehicles. The vehicle information includes a vehicle ID, a current position, a traveling direction, a traveling speed, time stamp, or the like. The V2X onboard device 15 may transmit or receive, to or from a different vehicle, position estimation accuracy information indicating a position estimation accuracy of the vehicle. The transmission or reception of information corresponds to a vehicle-to-vehicle communication. For example, the position estimation accuracy information may indicate whether the localization process is succeeded or not. Further, the position estimation accuracy information may be the number of positioning satellites captured by the GNSS receiver 14, the identification number of the positioning satellite, or the like.

The map storage 16 is a non-volatile memory that stores high accuracy map data. The high accuracy map data corresponds to map data indicating a road structure, a position coordinate of a planimetric feature disposed along the road and the like with an accuracy that can be used in the autonomous driving. For example, the high accuracy map data includes three-dimensional shape data of the road, lane data, or planimetric feature data. For example, the above-described three-dimensional shape data of the road may include node data related to a point (hereinafter, referred to as node) at which multiple roads intersect, merge, or branch, and link data related to a road connecting the points (hereinafter, referred to as link).

The link data indicates road edge information indicating position coordinates of the road edge, the width of the road, or the like. The link data may also include data indicating a road type, such as whether the road is a motorway or a general road. The motorway here refers to a road on which the pedestrian or the bicycle is prohibited from entering, such as a toll road or an expressway. The link data may include attribute information indicating whether autonomous driving is allowed in the road.

The lane data indicates the number of lanes, installation position information of lane boundary lines of each lane, traveling direction of each lane, and branching or merging points of each lane. The lane data may include, for example, information indicating whether the lane boundary line is provided by a solid line, a broken line, or Botts' dots. The position information of lane boundary line and the road edge (hereinafter referred to as lane boundary line and the like) is expressed as a coordinate group of points (that is, a point group) where the lane boundary is positioned. As another example, the position information of the lane boundary line and the like may be expressed by a polynomial expression. The position information of the lane boundary line and the like may be a set of line segments (that is, a line segment group) expressed by a polynomial expression.

The planimetric feature data may include position and type information of a road surface display, such as a stop line. The planimetric feature data may also include position, shape, and type information of a landmark. The landmark may include a three-dimensional structure installed along the roadside, such as the traffic sign, the traffic light, a pole, or a commercial sign. The map storage 16 may temporarily store the map data within a predetermined distance from the subject vehicle. The map data stored in the map storage 16 may be navigation map data for navigation purpose. The navigation map data has a lower accuracy than an accuracy of high precision map data, and has smaller amount of information about road shapes than the amount of information about the road shapes included in the high precision map data. When the navigation map data includes planimetric feature data such as a landmark, it is possible to describe the high precision map using the term of navigation map in the following description. As described above, the landmark referred herein is a planimetric feature used for subject vehicle position estimation, that is, the above-described localization process. The landmark may include a traffic sign.

The HMI system 17 provides an input interface function for receiving a user operation and an output interface function for presenting information to the user. The HMI system 17 includes a display 171 and an HMI control unit (HCU) 172. A presenting device that presents information to the user may include a speaker, a vibrator, an illumination device (for example, an LED), in addition to the display 171.

The display 171 is a device that displays an image. For example, the display 171 is a center display provided in an uppermost portion of a central part of the instrument panel in the vehicle width direction. The display 171 can perform a full-color display, and may be provided by a liquid crystal display, an organic light emitting diode (OLED) display, a plasma display, or the like. As the display 171, the HMI system 17 may include a head-up display that projects a virtual image on a portion of the front windshield in front of the driver seat. For example, the display 171 may be provided by a meter display positioned in the front side of the driver seat in the instrument panel.

The HCU 172 integrally controls information presentation to the user. For example, the HCU 172 may include a processor, such as a CPU or a GPU, a random access memory (RAM), and a flash memory. The HCU 172 controls a display screen of the display 171 based on information provided by the driving assist ECU 30 and signals from an input device (not shown). For example, the HCU 172 displays a deceleration notification image on the display 171 based on a request from the position estimator 20 or the driving assist ECU 30.

The position estimator 20 specifies a current position of the subject vehicle. The position estimator 20 will be described in detail later. The position estimator 20 mainly includes a computer, and the computer may include a processing unit 21, a RAM 22, a storage 23, a communication interface 24, a bus connecting these components. The processing unit 21 is provided by hardware circuit, and executes a calculation process in corporation with the RAM 22. The processing unit 21 includes at least one calculation core, such as a central processing unit (CPU). The processing unit 21 executes various processes by accessing the RAM 22, and is also referred to as a control unit. The storage 23 includes a non-volatile storage medium, such as a flash memory. The storage 23 stores a position estimation program, which is a program to be executed by the processing unit 21. The execution of the position estimation program by the processing unit 21 corresponds to the execution of a method corresponding to the position estimation program. The communication interface 24 communicates with other devices via the in-vehicle network Nw. The communication interface 24 may be implemented by an analog circuit element, an IC, or the like.

The driving assist ECU 30 executes partial or overall control of the driving operation instead of the occupant in the driver seat by controlling a traveling actuator 18 based on the detection results of the front camera 11 and the millimeter wave radar 12. The driving assist ECU 30 may be an autonomous driving device that controls the subject vehicle to autonomously travel based on a user's input of an autonomous traveling instruction. The driving assist ECU 30 corresponds to a vehicle control module.

The traveling actuator 18 refers to an actuator that controls accelerating, decelerating, and turning of the vehicle. For example, the traveling actuator 18 may include a brake device, an electronic throttle, a steering actuator, or the like. For example, the brake device may include a brake actuator. When the vehicle is an electric vehicle or a hybrid vehicle, the traveling actuator 18 also includes a motor that generates torque for rotating driving wheels. Another ECU, such as a brake ECU or a steering ECU may be interposed between the traveling actuator 18 and the driving assist ECU 30.

The driving assist ECU 30 includes a speed control unit H1 that provides an adaptive cruise control (ACC) function as one of vehicle control functions. The ACC function controls the vehicle to travel at a constant speed, which is set to a predetermined target speed. When a preceding vehicle exists within a predetermined distance, the ACC function controls the vehicle to follow the preceding vehicle by keeping a predetermined inter-vehicle distance. The speed control unit H1 automatically adjusts a traveling speed of the vehicle based on the user's operation when the driving assist function is in activated state. The user sets the target speed when the ACC function controls the vehicle to travel at the constant speed. The ACC target speed set by the user is also referred to as a user-set vehicle speed.

In the ACC function, the user or the system specification may set a vehicle speed variable range, which is a range of speed that can be set as the speed of vehicle in the ACC activated state. An upper limit and a lower limit of the vehicle speed variable range may be set to a variable value set by the user within a range that conforms to traffic laws and ensures safety as system capability. The vehicle speed variable range may be individually set for each road type such as general road or expressway. The lower limit of the vehicle speed variable range may be set to zero. The above-described user-set vehicle speed may be set within the vehicle speed variable range. The target speed of the ACC function may be temporarily changed based on a request from the deceleration request unit F8, which will be described later, in addition to the user setting. The upper limit of the vehicle speed variable range is also referred to as ACC upper limit speed.

The driving assist ECU 30 mainly includes a computer, and the computer may include a processing unit 31, a RAM 32, a storage 33, a communication interface 34, and a bus connecting these components. The processing unit 31 is combined with the RAM 32, and is provided by a hardware for executing an arithmetic processing. The processing unit 31 includes at least one arithmetic core, such as a CPU. The processing unit 31 executes, by accessing the RAM 32, various processes for implementing various functions, such as the ACC function. The processing unit 31 is also referred to as a control unit. The storage 33 includes a non-volatile storage medium, such as a flash memory. The storage 33 stores a driving assist program, which is a program to be executed by the processing unit 31. Execution of the driving assist program by the processing unit 31 corresponds to execution of a method corresponding to the driving assist program.

(Function of Position Estimator 20)

Figure 3:
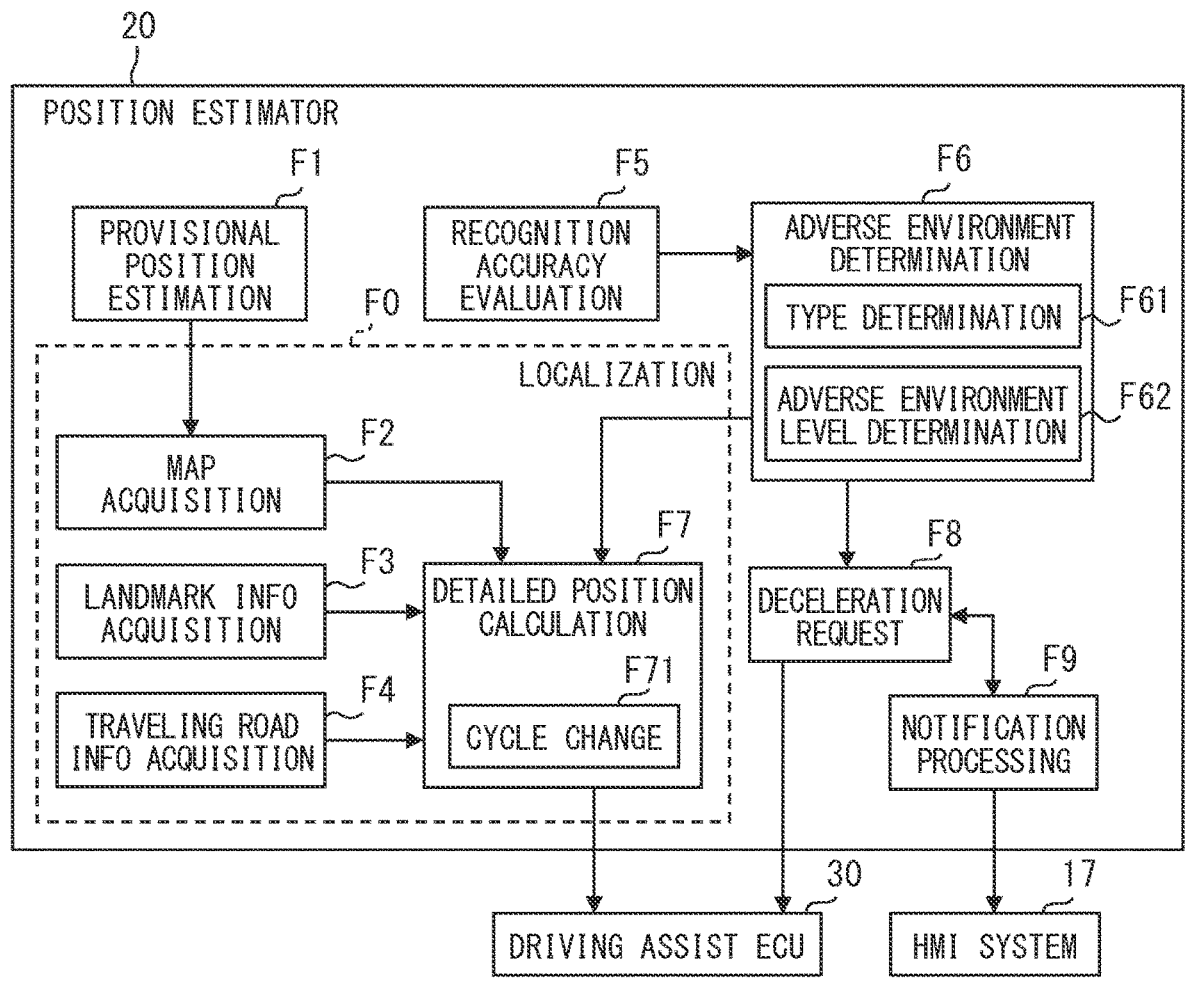
FIG. 3 is a block diagram showing a functional configuration of a position estimator.

The following will describe functions and an operation of the position estimator 20 with reference to FIG. 3. The position estimator 20 provides functions corresponding to various functional blocks shown in FIG. 3 by executing the position estimation program stored in the storage 23. The position estimator 20 includes, as functional blocks, a provisional position estimation unit F1, a map acquisition unit F2, a landmark information acquisition unit F3, a traveling road information acquisition unit F4, a recognition accuracy evaluation unit F5, an adverse environment determination unit F6, a detailed position calculation unit F7, a deceleration request unit F8, and a notification processing unit F9. The detailed position calculation unit F7 includes a cycle change unit F71.

The provisional position estimation unit F1 sequentially specifies the position of subject vehicle by combining a positioning result of the GNSS receiver 14 and a measurement result of the inertial sensor. For example, the provisional position estimation unit F1 may perform a dead reckoning (autonomous navigation) using the yaw rate and the vehicle speed when the positioning results from the GNSS cannot be obtained, such as in a tunnel. The yaw rate used in the dead reckoning may be a yaw rate recognized by the camera ECU 41 using the SfM technology, or may be a yaw rate detected by the yaw rate sensor.

The map acquisition unit F2 reads, from the map storage 16, map data in a predetermined range defined based on the current position. The provisional position estimation unit F1 may specify the current position used for map reference, or the detailed position calculation unit F7 may specify the current position used for map reference. For example, when the detailed position calculation unit F7 can calculate the current position, the map data is acquired using the position information calculated by the detailed position calculation unit. When the detailed position calculation unit F7 cannot calculate the current position, the map data is acquired using the position coordinates calculated by the provisional position estimation unit F1. Immediately after an ignition switch of the vehicle is turned on, the map reference range is determined based on the previous position calculation result stored in the memory. This is because the previous position calculation result stored in the memory corresponds to an end point of the previous trip, that is, a parking position. The map acquisition unit F2 may sequentially download the map data corresponding to the current position of the subject vehicle from an external server or the like via the V2X onboard device 15. The map data corresponding to the current position of the subject vehicle refers to map data of a parcel or a road segment within a predetermined distance from the current position of the subject vehicle.

For example, the landmark information acquisition unit F3 may acquire, from the front camera 11, a relative position, a type, color of the landmark, which is recognized by the front camera 11 (actually, by the cameral ECU 41). When the front camera 11 is configured to be able to extract a character string added to a signboard or the like, the character information written on the signboard or the like may also be acquired by the landmark information acquisition unit. When the character information of the landmark can be acquired, it becomes easy to link the landmark, which is observed by the front camera, with the landmark on the map.

The landmark information acquisition unit F3 also converts the relative position coordinates of the landmark acquired from the camera ECU 41 into position coordinates (hereinafter also referred to as observation coordinates) in the global coordinate system. It is possible to calculate the observation coordinates of the landmark by combining the current position coordinates of the subject vehicle and the relative position information of the planimetric feature with respect to the subject vehicle. When the detailed position calculation unit F7 can calculate the current position, the position information may be used as the current position coordinates of the vehicle used to calculate the observation coordinates of the landmark. When the detailed position calculation unit F7 cannot calculate the current position, the position coordinates calculated by the provisional position estimation unit F1 may be used as the current position coordinates of the vehicle. The camera ECU 41 may calculate the observation coordinates of the landmark using the current position coordinates of the subject vehicle.

The landmark information acquisition unit F3 may specify the relative position of the landmark by complementarily combining the recognition result of the front camera 11 and the detection result of the millimeter wave radar 12 or the LiDAR. For example, the landmark information acquisition unit F3 may determine the observation position of the landmark by complementarily combining the recognition result of the front camera 11 and the detection result of the millimeter wave radar 12. Specifically, the landmark information acquisition unit F3 may specify, by using both of the recognition result of the front camera 11 and the detection result of the millimeter wave radar 12, (i) the distance between the landmark and the subject vehicle and (ii) an elevation angle or a height of the landmark. In general, cameras are advantageous to estimate positions in the horizontal direction, but not advantageous to estimate positions and distances in the height direction. The millimeter wave radar 12 is advantageous to estimate positions in the distance or height direction. The millimeter wave radar 12 is less affected by the weather condition, such as fog or rainfall. According to the configuration in which the position of the landmark is estimated by using the front camera 11 and the millimeter wave radar 12 in a complementary manner as described above, it is possible to specify the relative position of the landmark with higher accuracy. As a result, the estimation accuracy of the position of the subject vehicle by the localization process can be improved.

The traveling road information acquisition unit F4 acquires traveling road data from the camera ECU 41 of the front camera 11. That is, the relative position of the lane marking or the road edge recognized by the front camera 11 is acquired. Similar to the landmark information acquisition unit F3, the traveling road information acquisition unit F4 may convert the relative position information of the lane boundary line or the like into position coordinates in the global coordinate system.

The recognition accuracy evaluation unit F5 acquires a reliability of the recognition result output from the front camera 11. For example, when the detailed position calculation unit F7 executes the localization process by using a different landmark from the one used previously, the recognition accuracy evaluation unit F5 calculates, as a position estimation error, an error between the subject vehicle position coordinates calculated by the provisional position estimation unit F1 and the result of the localization process. The position estimation error increases with an increase of a period during which localization cannot be performed, and a large position error indirectly indicates the length of the period during which the localization cannot be performed. In addition to a case where the installation interval of the landmarks is long, a decrease in recognition performance of the front camera 11 may also be considered as a reason of increase in the period during which localization cannot be performed. Thus, the position estimation error can also be used as an indicator of the object recognition performance of the front camera 11. During the period when the localization process cannot be executed, a provisional position estimation error may be successively calculated by multiplying an elapsed time from a last execution time of the localization process or a traveling distance from a last execution time of the localization process by a predetermined error estimation coefficient. A functional module that calculates the position estimation error may be provided as an error estimation unit separately from the recognition accuracy evaluation unit F5.

The recognition accuracy evaluation unit F5 evaluates the recognition performance based on a miss rate, which is a rate of failure to detect the landmark that is registered on the map and that should be detected on the traveling locus of the subject vehicle. The miss rate may be calculated based on (i) the total number N of the landmarks registered on the map within a certain distance and (ii) the number of successful detections m, which is the number of landmarks that are successfully detected before passing through. For example, the miss rate may be calculated by a mathematical expression (N−m)/N. As another example, the total number N may be the number of landmarks, which are present within a predetermined distance (for example, 35 meters) in front of the current position and which should be visible from the current position. In this case, the number m of successful detections may be the number of landmarks that can be detected at the current position.

The recognition accuracy evaluation unit F5 calculates an effective recognition distance, which is a limit value of a range that the front camera 11 can actually recognize the landmark. The effective recognition distance is a parameter that varies due to external factors such as fog, rainfall, or afternoon sun, unlike a designed recognition limit distance. When the designed recognition limit distance is about 100 meters, the effective recognition distance may be reduced to, for example, less than 20 meters during heavy rain.

The recognition accuracy evaluation unit F5 may calculate the effective recognition distance based on the farthest recognition distance of at least one landmark that is detected within a predetermined time. The farthest recognition distance is the farthest distance from which the same landmark can be detected. In another example, a distance from the vehicle to a landmark, at a time point when a previously undetected landmark is detected as the subject vehicle moves, may be set as the farthest recognition distance of the landmark. When multiple farthest recognition distances for multiple landmarks are obtained, an average value, a maximum value, or a second largest value of the multiple farthest recognition distances may be set as the effective recognition distance.

For example, when the farthest recognition distances of four landmarks observed within the most recent predetermined time are 50 meters, 60 meters, 30 meters, and 40 meters, the effective recognition distance may be calculated as the average value of 45 meters. The farthest recognition distance of the landmark corresponds to the detection distance at a time point when the landmark can be detected for the first time. The effective recognition distance may be set as the maximum value of the multiple farthest recognition distance observed within the most recent predetermined time.

The effective recognition distance of the landmark may be reduced by other factors, such as weather, occlusion by a preceding vehicle. Thus, when a preceding vehicle is present within the predetermined distance, the calculation of the effective recognition distance may be omitted. Alternatively, when a preceding vehicle is present, the effective recognition distance may be provided to the adverse environment determination unit F6 by adding data indicating the presence of the preceding vehicle (for example, a preceding vehicle flag). When the road ahead the subject vehicle is not a straight road, that is, when the road ahead is a curved road, the effective recognition distance may also be decreased. Therefore, when the road ahead is the curved road, calculation of the effective recognition distance may be omitted. Further, when the road ahead is the curved road, the effective recognition distance may be provided to the adverse environment determination unit F6 in association with data (for example, a curve flag) indicating that the road ahead is curved. A road having a curvature equal to or greater than a threshold value may be determined as the curved road.

When multiple types of planimetric features are set as the landmarks, the landmarks used by the recognition accuracy evaluation unit F5 to calculate the effective recognition distance may be limited to certain types. For example, the landmarks used to calculate the effective recognition distance may be limited to high-altitude landmarks, such as direction signboards, which are landmarks disposed above the road surface by a predetermined distance (for example, 4.5 meters) or more. By limiting the landmarks used to calculate the effective recognition distance to the high-altitude landmarks, it is possible to prevent the effective recognition distance from being decreased due to other vehicles blocking the field of view.

In addition to the effective recognition distances of the discrete planimetric features such as signs, the recognition accuracy evaluation unit F5 may calculate the effective recognition distance of the continuous planimetric feature along the road, such as the lane boundary line and the road edges. The effective recognition distance of lane boundary line corresponds to information indicating how far the road surface ahead of the subject vehicle can be recognized. It is possible to determine the effective recognition distance of the lane boundary line, for example, based on a distance to the most distant detection point among the multiple detection points of the lane boundary line. The effective recognition distance of road edge may be determined in similar manner. The effective recognition distances of various planimetric features, such as landmarks, lane boundary lines, and road edges also correspond to evaluation values of recognition accuracy.

The adverse environment determination unit F6 is configured to determine whether the surrounding environment of the subject vehicle corresponds to an environment that may reduce the performance or accuracy of the object recognition, which is performed by using the image frame captured by the front camera 11. That is, the adverse environment determination unit F6 is configured to determine whether the surrounding environment of the subject vehicle is the adverse environment for the front camera 11.

For example, the adverse environment determination unit F6 may determine whether the surrounding environment corresponds to the adverse environment based on the effective recognition distance calculated by the recognition accuracy evaluation unit F5. For example, the adverse environment determination unit F6 may determine that the environment is adverse when the effective recognition distance is smaller than a predetermined threshold (hereinafter referred to as distance threshold). A specific value of the distance threshold may be set to, for example, within a range of 20 meters to 30 meters. As an example, the distance threshold is set to 25 meters. The distance threshold may be determined according to the designed recognition limit distance of the system or device. For example, a value corresponding to 10% or 20% of the designed recognition limit distance may be set as the distance threshold. The distance threshold may be adjusted according to the toad type. The distance threshold used for intercity highway may be set to a larger value than the distance threshold used for general road or local highway. Usually, the traveling speed is higher on intercity highway than the traveling speed on general road or local highway. Thus, a strict threshold may be set for the intercity highway when determining the adverse surrounding environment. The intercity highway is a highway that connects multiple cities. The local highway is a motorway whose extension range is limited to one city. The local highway may be configured to allow movement of vehicles to outside of the city by connecting with other motorways at junctions.

The determination of the adverse environment based on the effective recognition distance may be canceled when a preceding vehicle is present or the subject vehicle is traveling on a curved road. It is possible to reduce the possibility of erroneously determining that the surrounding environment is the adverse environment due to the presence of a preceding vehicle or a change in road curvature. When a preceding vehicle is present, it is sufficient to travel by following the preceding vehicle. Thus, there is no need to strictly specify the position of subject vehicle. Accordingly, it is not highly necessary to determine whether the surrounding environment is the adverse environment. That is, absence of preceding vehicle corresponds to a scene in which it is highly necessary to accurately estimate the position of subject vehicle.

The adverse environment determination unit F6 may determine that the environment is adverse for the rainy or foggy weather condition. The rainy weather may be determined using a detection value of rain sensor and an operation state (including operation speed) of wiper. The foggy weather may be detected from an operation state of fog lamp. Information related to weather, such as fog and rain may be acquired from an external server through communication via the V2X onboard device 15. The adverse environment determination unit F6 may determine that the environment is adverse when the subject vehicle is exposed to the afternoon sun. Whether or not the vehicle is exposed to the afternoon sun may be determined from the time zone, the traveling direction of the subject vehicle, and the color information or luminance distribution of the entire image frame. The afternoon sun refers to light from the sun whose angle (also known as height angle) with respect to the horizon line is, for example, 25 degrees or less.

The adverse environment determination unit F6 may determine whether the surrounding of the subject vehicle corresponds to the adverse environment by acquiring data of the area corresponding to the adverse environment from the map server. For example, the map server may specify and distribute adverse environment areas based on reports from multiple vehicles. According to this configuration, it is possible to reduce the computation load for determining whether the surrounding environment of subject vehicle is the adverse environment. The adverse environment determination unit F6 may share the provisional determination result of whether the surrounding environment is the adverse environment with different vehicles via the V2X onboard device 15, and may determine whether the surrounding environment corresponds to the adverse environment by majority vote or the like.

The adverse environment determination unit F6 of the present embodiment may include a type specification unit F61 and an adverse environment level determination unit F62. Both of the type specification unit F61 and the adverse environment level determination unit F62 are not essential for the adverse environment determination unit. The adverse environment determination unit F6 may include only the type specification unit F61. Alternatively, the adverse environment determination unit F6 may include only the adverse environment level determination unit F62.

The type specification unit F61 is configured to specify a type of the adverse environment. The type of adverse environment can be substantially classified into heavy rainfall, fog, afternoon sun, and others. For example, when (i) the effective recognition distance of the landmark is equal to or less than a predetermined distance threshold and (ii) the lane boundary line and the high landmark existing within the first distance from the subject vehicle can be recognized, the type specification unit F61 determines that the adverse environment is the fog. When (i) the effective recognition distance of the lane boundary line or the landmark is equal to or less than the first predetermined distance and (ii) the lane boundary line or the like existing within the first distance from the subject vehicle can be recognized, the type of adverse environment is determined as afternoon sun. When the lane boundary line or the landmark in the vicinity of the vehicle cannot be recognized, the type of adverse environment is determined as heavy rain. For example, the vicinity of the vehicle here may refer to a range within 15 meters from the vehicle.

Information such as the time, temperature, humidity, wiper operation state, or the like may be used together when determining the type of the adverse environment. For example, the adverse environment may be determined as heavy rain when the lane boundary line or the landmark existing in the vicinity of the vehicle cannot be recognized and the operation speed of wiper is equal to or higher than a predetermined threshold. As another example, when determining the adverse environment is the fog or not based on the effective recognition distance, a predetermined condition set for the occurrence of fog may be determined. The predetermined condition set for the occurrence of fog may include temperature, humidity, landform, or the like. As another example, under the condition that the time of day and the traveling direction of subject vehicle satisfy the condition for being exposed to the afternoon sun, the type of adverse environment may be determined as afternoon sun based on the effective recognition distance.

Rainfall may be determined by classifying the rainfall into multiple levels according to the strength of rainfall (that is, amount of rainfall), such as light rainfall, strong rainfall, heavy rainfall, or the like, instead of being classified only into heavy rainfall. When the operation speed of the windshield wiper is low, the adverse environment may be determined as normal rainfall. The heavy rainfall may be defined as rain falling at a rate that the amount of rainfall per hour exceeds a predetermined threshold (for example, 50 millimeters). In the present disclosure, as an example, rainfall with an amount of rainfall of less than 10 millimeters is described as light rainfall, and rainfall with an amount of rainfall of equal to or greater than 20 millimeters and less than 50 millimeters is described as strong rainfall. The strength of rain is classified into three levels, but the number of classifications of the strength of rain can be changed as appropriate.

Figure 12:
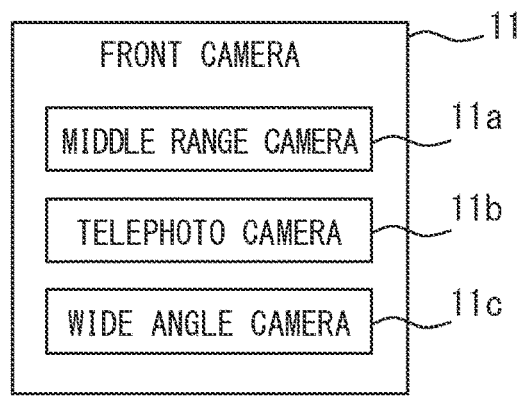
FIG. 12 is a diagram showing an exemplary configuration of the front camera.

As shown in FIG. 12, the adverse environment level determination unit F62 may evaluate a level of the adverse environment, in other words, a level of deterioration in object recognition performance executed based on the image frame. For example, the adverse environment level may be classified in four level 0 to level 3. A higher level indicates a highly adverse environment. The level of adverse environment can be evaluated based on the effective recognition distance. For example, the adverse environment level determination unit F62 may determine the adverse environment as level 1 when the effective recognition distance is less than a predetermined first distance and equal to or greater than a second distance. The adverse environment level determination unit F62 may determine the adverse environment as level 2 when the effective recognition distance is less than the predetermined second distance and equal to or greater than a third distance. When the effective recognition distance is less than the third distance, the level of adverse environment may be determined as level 3. When the effective recognition distance is equal to or greater than the first distance, the level of adverse environment is determined as level 0, that is, the environment is not adverse.

The first distance may be the same value (25 meters) as the distance threshold described above. The second distance is set shorter than the first distance. For example, the second distance may be set to a value that is 5 meters shorter than the first distance, for example, may be set to 20 meters. The third distance is set shorter than the second distance. For example, the third distance may be set to a value that is 5 meters shorter than the second distance, for example, may be set to 15 meters. The numerical value of level indicating the adverse environment level may be changed as appropriate. The above numerical values are described as an example, and may be changed as appropriate according to the camera performance. For example, the first distance may be set to 60 meters, 50 meters, 40 meters, or the like. The second distance may be set to 40 meters, 30 meters, or the like. The third distance may be set to 30 meters, 20 meters, or the like. The difference between the first distance and the second distance and the difference between the second distance and the third distance are not limited to 5 meters, and may be properly set to, for example, 10 meters or 20 meters.

The adverse environment level determination unit F62 may evaluate the adverse environment level according to the amount of rainfall. For example, when the amount of rainfall corresponds to light rainfall, the adverse environment level is set to level 1, and when the amount of rainfall corresponds to strong rainfall, the adverse environment level is set to level 2. When the amount of rainfall corresponds to heavy rainfall, the adverse environment level is set to level 3. The amount of rainfall may be estimated from the operation speed of the windshield wiper blade or may be determined by acquiring the weather information from the external server.

The detailed position calculation unit F7 executes the localization process based on the landmark information acquired by the landmark information acquisition unit F3 and the traveling road information acquired by the traveling road information acquisition unit F4. The localization process refers to a process of specifying a detailed position of the subject vehicle by comparing the position of the landmark or the like specified based on the image captured by the front camera 11 and the position coordinates of the planimetric feature registered in the high accuracy map data. Since relative position information of landmark or the like is also used for the position specifying process, the position specifying process of relative positions of landmark and lane boundary line based on image data may be included in the localization process. Hereinafter, a configuration including the map acquisition unit F2, the landmark information acquisition unit F3, the traveling road information acquisition unit F4, and the detailed position calculation unit F7 is also referred to as a localization unit F0.

The detailed position calculation unit F7 performs longitudinal position estimation using the landmark, such as a direction signboard. As the longitudinal position estimation, the detailed position calculation unit F7 links the landmark, which is registered on the map, with the landmark, which is observed by the front camera 11, based on the observation coordinates of the landmark. For example, among the landmarks registered on the map, the landmark closest to the observation coordinates of the landmark is estimated to be the same landmark. When matching the landmark, the landmark with a higher matching level may be selected based on feature amount, such as shape, size, color, or the like. When the link between the observed landmark and the landmark registered on the map is completed, a longitudinal position of the subject vehicle on the map is set at a position shifted to a front direction of landmark registered on the map by a distance between the observation landmark and the subject vehicle from the position of the landmark registered on the map. The front direction of landmark refers to a direction opposite to the traveling direction of the subject vehicle. When the subject vehicle is traveling forward, the front direction of landmark corresponds to the rear direction of subject vehicle.

For example, when a distance from the subject vehicle to a direction signboard located in front of the subject vehicle is specified as 100 meters as an image analysis result, it is determined that the subject vehicle is located at a position shifted by 100 meters in a front direction of the direction signboard from the position coordinates of the direction signboard registered in the map data. The longitudinal position estimation corresponds to a process of specifying the position of the subject vehicle in the road extension direction. The longitudinal position estimation may also be referred to as the localization process in the longitudinal direction. By performing such longitudinal position estimation, the detailed remaining distance to a feature point on the road (that is, POI), such as an intersection, a curved entrance or exit, a tunnel entrance or exit, a tail end of the traffic congestion is specified.

For example, when multiple landmarks (for example, direction signboards) are detected on the front side of the subject vehicle, the detailed position calculation unit F7 uses, among the multiple landmarks, the landmark closest to the subject vehicle and performs the longitudinal position estimation. The recognition accuracy of a type or a distance of an object based on an image or the like increases as the object is closer to the vehicle. That is, when multiple landmarks are detected, it is possible to improve the estimation accuracy of the position by performing the longitudinal position estimation using the landmark closest to the vehicle.

The detailed position calculation unit F7 performs lateral position estimation by using the observed coordinates of the planimetric feature that is continuously present along the road, such as the lane boundary line or the road edge. The lateral position estimation refers to identifying of the traveling lane and identifying of the detailed position of subject vehicle within the traveling lane. For example, the detailed position of subject vehicle in the traveling lane is the amount of offset in the left-right direction from the center of the traveling lane. For example, the lateral position estimation is performed based on a distance from the left or right road edge or the lane boundary line recognized by the front camera 11. For example, when a distance from the left road edge to the vehicle center is specified as 1.75 meters as an image analysis result, it is determined that the subject vehicle is located at a position shifted by 1.75 meters to the right from the coordinates of the left road edge indicated by the map. The lateral position estimation may also be referred to as lateral direction localization process. As another example, the detailed position calculation unit F7 may perform both of the lateral direction and longitudinal direction localization processes by using the landmark such as a direction signboard.

The position of subject vehicle as a result of the localization process may be represented in the same coordinate system as the map data, such as latitude, longitude, and altitude. Thus, it is possible to represent the subject vehicle position information in any absolute coordinate system, such as world geodetic system 1984 (WGS84).

When the landmark (that is, image capture) can be recognized, the detailed position calculation unit F7 successively executes the localization process at a predetermined position estimation cycle. For example, a default value of the position estimation cycle may be set to 100 milliseconds.

As another example, a default value of the position estimation cycle may be set to 200 milliseconds or 400 milliseconds. The cycle change unit F71 sets the position estimation cycle to a predetermined value for adverse environment purpose when the adverse environment determination unit F6 determines the adverse environment. The predetermined value is shorter than the default value. The predetermined value for adverse environment purpose may be set to a half the default value, such as 50 milliseconds. Alternatively, the predetermined value for adverse environment purpose may be set to 80 milliseconds, 40 milliseconds, or the like. The predetermined value for adverse environment purpose may be set to a value corresponding to the frame rate of the front camera 11 and the processing speed of the identifier G1.

The detailed position calculation unit F7 specifies, based on distance information from the road edge, an ego lane ID, which is the identifier (identification number) of the lane in which the subject vehicle is traveling. The distance information from the road edge is detected by the front camera 11 and the millimeter wave radar 12. The lane ID indicates which lane is the current traveling lane of subject vehicle from or relative to the left edge or right edge of the road. In an area where the vehicles drive on the right side, a lane number of the ego lane ID may be assigned relative to the right edge of the road. The camera ECU 41 may identify the ego lane ID. The ego lane is also referred to as a subject vehicle lane or a subject vehicle traveling lane.

When the adverse environment determination unit F6 determines the adverse environment, the deceleration request unit F8 outputs a predetermined deceleration request signal to the driving assist ECU 30. For example, the deceleration request signal may be a signal that requests a decrease of the set value of the target speed by a predetermined amount from the current value. The deceleration amount requested by the deceleration request signal may be a fixed amount, such as 3 km/h, 5 km/h, or 10 km/h. Alternatively, the deceleration amount may be a value correlated to the target speed, such as 10% of the target speed. Alternatively, the deceleration request signal may request deceleration of the current speed to a preset restrict speed. The restrict speed may be set according to the road type. For example, the restrict speed may be set to 60 km/h for expressways, and may be set to 40 km/h for general roads.

The deceleration request signal may request a decrease of current set value of the target speed as described above, or may request a decrease of ACC upper limit speed. When the current target speed reaches the ACC upper limit speed, the vehicle speed can be indirectly suppressed by lowering the ACC upper limit speed.

The notification processing unit F9 cooperates with the HMI system 17 to present vehicle position estimation state and related information thereof. For example, when the driving assist ECU 30 restricts the vehicle speed based on a request from the deceleration request unit F8, the notification processing unit F9 cooperates with the HMI system 17 to notify the vehicle speed restriction due to the adverse environment. For example, the notification processing unit F9 may control the display 171 to display a deceleration notification image. The notification about speed restriction may be performed by outputting a voice message from a speaker. The time at which the speed restriction notification is issued is not limited to when the driving assist ECU 30 actually starts restriction of the vehicle speed.

Figure 4:
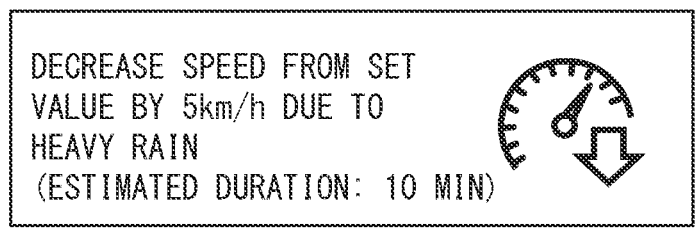
FIG. 4 is a diagram showing an example of deceleration notification image.
Figure 5A:
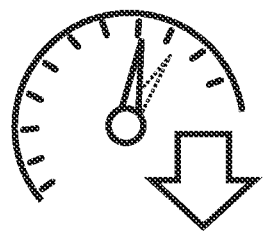
FIG. 5A and FIG. 5B are diagrams showing other examples of deceleration notification image.
Figure 5B:
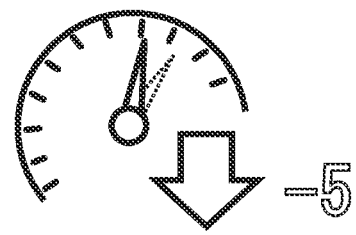

As shown in FIG. 4, the deceleration notification image may include a deceleration amount, a deceleration reason, and an estimated period for maintaining a deceleration state. By including the deceleration amount or the like in the deceleration notification image, it is possible to suppress the user from feeling discomfort for the deceleration of vehicle. A configuration in which the user is notified of the reason for deceleration due to heavy rain, afternoon sun, or the like can further enhance the user's sense of satisfaction and improve user experience. The deceleration notification image may include a text message as shown in FIG. 4. The deceleration notification image may be an icon that does not include any text information as shown in FIG. 5A. The deceleration notification image may be an icon that includes text information indicating speed after change, such as the deceleration amount as shown in FIG. 5B. In the examples shown in FIG. 5A and FIG. 5B, an additional icon image indicating an adverse environment type, such as heavy rain or afternoon sun may be added to the icon image.

Before the execution of speed restriction, for example, before an output of the deceleration request signal, the notification processing unit F9 may inquire the user whether to restrict the vehicle speed by using a deceleration confirmation message. The deceleration confirmation message may include a predetermined image or voice message. The deceleration request unit F8 may output the deceleration request signal to the driving assist ECU 30 when the user permits the restriction of vehicle speed. The driving assist ECU 30 may inquire the user whether to restrict the vehicle speed instead of the notification processing unit.

Similar to the deceleration notification image, the deceleration confirmation image may include the deceleration amount and the estimated period for maintaining the deceleration state. By including the deceleration amount or the like in the deceleration confirmation message, it is possible to reduce the risk of deceleration to a level not intended by the user. Since the degree of deceleration is announced, the use is less likely to be confused by the deceleration. As a result, it is possible to improve the user experience.

(Operation Flow of Position Estimator 20)

Figure 6:
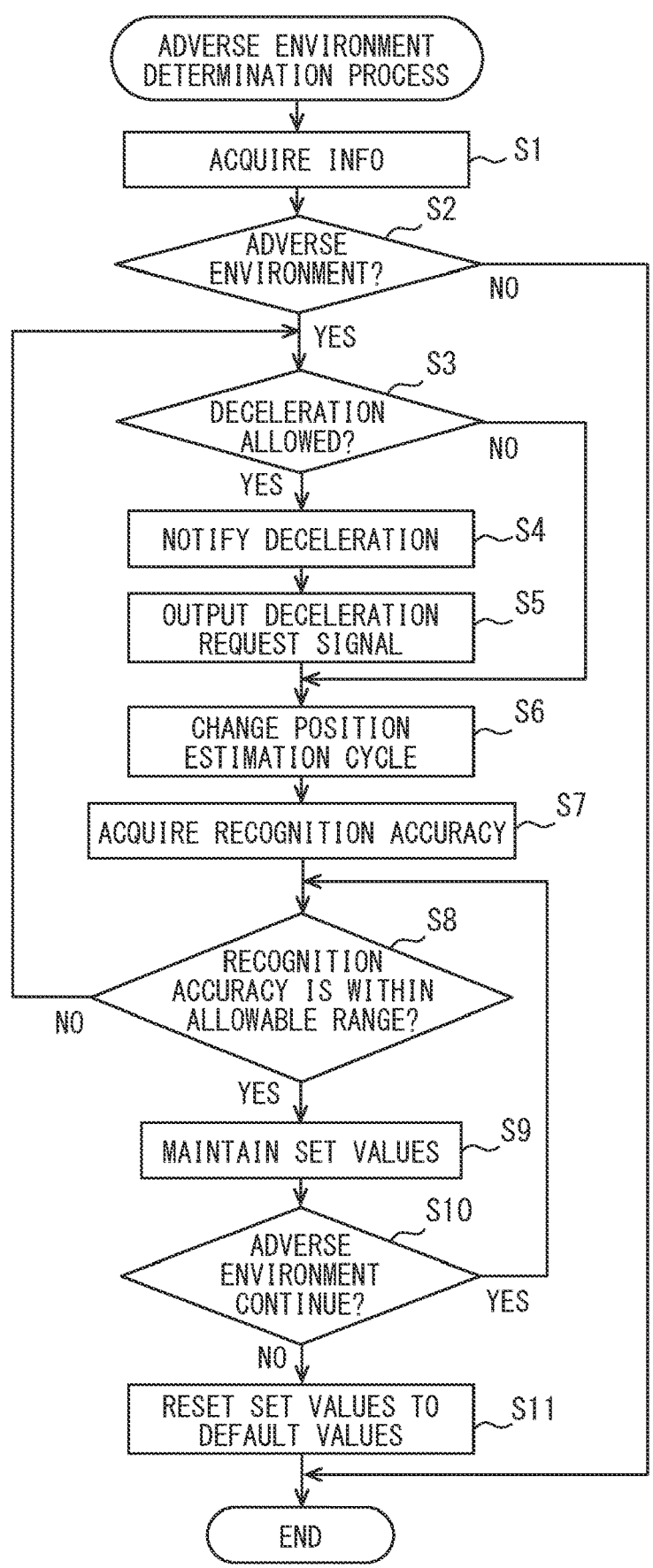
FIG. 6 is a flowchart showing an adverse environment determination process executed by the position estimator.

The following will describe an adverse environment determination process executed by the position estimator 20 with reference to a flowchart shown in FIG. 6. For example, the process of flowchart shown in FIG. 6 is performed at a predetermined cycle (for example, every one second) during a turn-on state of a traveling power supply to the vehicle. For example, the traveling power supply is an ignition power supply in an engine vehicle. In an electric vehicle, a system main relay corresponds to the traveling power supply. The detailed position calculation unit F7 may execute the localization process separately from (that is, in parallel manner) the adverse environment determination process shown in FIG. 6 according to a default setting or a setting determined by the adverse environment determination process. In the present embodiment, the adverse environment determination process includes S1 to S11 as an example.

In S1, the adverse environment determination unit F6 acquires various information such as the effective recognition distance, temperature, and humidity for determining whether the current environment is an adverse environment, and the process proceeds to S2. In S2, the adverse environment determination unit F6 determines whether the current environment is the adverse environment. For example, when the effective recognition distance is less than a predetermined distance threshold, the process determines that the environment is adverse, and the process proceeds to S3. When determining that the environment is not adverse, the process shown in FIG. 6 is ended. When determining that the environment is not adverse, the detailed position calculation unit F7 executes the localization process with predetermined default setting.

In S3, the deceleration request unit F8 determines whether deceleration is allowed. For example, whether the deceleration is allowed may be determined based on the user's response to the deceleration confirmation message output in cooperation with the notification processing unit F9. When the user permits the deceleration, the process may determine that the deceleration is allowed. When the user does not permit the execution of deceleration, the process may determine that deceleration is not allowed. The user's response can be acquired via an operation made on a switch provided on a steering wheel, an input operation on a touch panel, a voice input to an audio input device, or the like.

In S3, the deceleration request unit F8 may determine whether the deceleration is allowed based on whether the current set value of the target speed is decreased to the lower limit of predetermined vehicle speed variable range. That is, when the set value of the target speed reaches the lower limit of the vehicle speed variable range, the process may determine that deceleration is not allowed. When the set value of target speed does not reach the lower limit of the vehicle speed variable range, or when the set value of target speed is higher than the lower limit by a predetermined value or more, the process may determine that the deceleration is allowed. When determining that the deceleration is allowed, the process proceeds to S4. When determining that the deceleration is not allowed, the process proceeds to S6.

In S4, the notification processing unit F9 notifies that the vehicle speed is to be decreased by a predetermined amount. For example, the notification processing unit may display a deceleration notification image on the display 171, and the process proceeds to S5. The displayed state of deceleration notification image may be continued while the deceleration caused by the adverse environment determination is being executed.

In S5, the deceleration request unit F8 cooperates with the driving assist ECU 30 to execute the restriction of vehicle speed. Specifically, the deceleration request unit F8 outputs a deceleration request signal to the driving assist ECU 30, and the driving assist ECU 30 executes the deceleration based on the deceleration request signal. As described above, the deceleration may be executed by decreasing the target speed or by decreasing the ACC upper limit speed. As an example, the amount of deceleration corresponding to each deceleration request may be set to 2 km/h. After the process in S5 is completed, the process proceeds to S6. In general, when the vehicle is moving at a low speed, the image captured by the front camera 11 has a higher resolution compared with the image captured when the vehicle is moving at a high speed. When the image has a higher resolution, the accuracy of object recognition using the image is also improved. That is, by executing the deceleration of vehicle speed in S5, the accuracy of object recognition by the front camera 11 may be recovered.

In S6, the cycle change unit F71 changes the position estimation cycle from the default value to the value corresponding to adverse environment. As a result, the frequency at which the detailed position calculation unit F7 executes the localization process is increased. Thus, even in the adverse environment, the number of successful executions of localization process per unit time can be maintained at the same level as the number of successful executions of localization process in the normal environment. After a certain time period has elapsed from the completion of S6, or the localization process has been executed a predetermined number of times, the process proceeds to S7. The process in S7 may be executed when the vehicle passes a landmark.

In S7, the recognition accuracy evaluation unit F5 acquires information on recognition accuracy. For example, the recognition accuracy evaluation unit F5 acquires a reliability of object recognition from the front camera 11, and the process proceeds to S8. In S8, the process determines whether the evaluation value of recognition accuracy of the front camera 11 is within a predetermined allowable range. For example, the process may determine whether the reliability acquired in S7 is equal to or higher than a predetermined threshold. The reliability of object recognition corresponds to the evaluation value of recognition accuracy. When the reliability is equal to or higher than the predetermined threshold, the recognition accuracy is considered to be within the allowable range, and the process proceeds to S9. When the reliability is less than the predetermined threshold, the recognition accuracy is considered to be out of the allowable range, and the processes returns to S3 and repeats S3 and the subsequent process.

Figure 7:
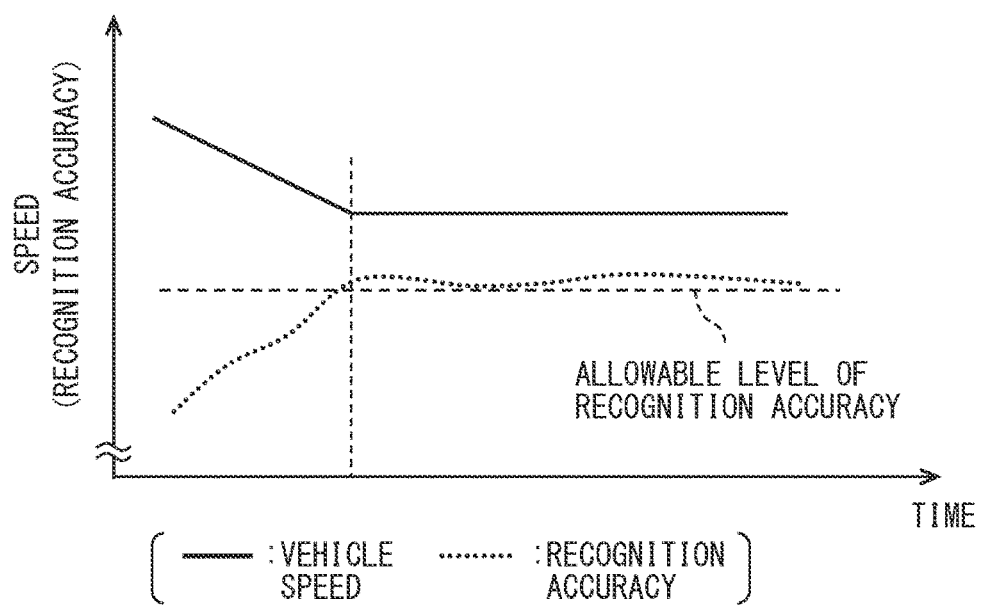
FIG. 7 is a diagram showing an operation of a deceleration request unit.

By repeatedly executing S3 to S8, the vehicle speed may gradually decrease, for example, as shown in FIG. 7. The deceleration for reducing the vehicle speed may be set to, for example, 0.5 m/s$^2$ (~0.05 G). According to this configuration, the vehicle is gradually decelerated. Thus, it is possible to suppress the occupant in the driver seat from feeling uncomfortable, and the user experience can be improved. Then, the deceleration stops when the accuracy of object recognition becomes within the allowable range. In one aspect, such a configuration corresponds to a configuration that decelerates the vehicle until the recognition accuracy reaches an allowable level. Such a configuration also corresponds to a configuration that stops further deceleration when the recognition accuracy reaches the allowable level.

As described above, the decrease amount of the target speed per one time is set to about several km/h, and the deceleration process and the confirmation of the recognition accuracy are repeatedly executed, thereby suppressing unnecessary deceleration. The cycle change in S6 only needs to be executed once in the flow, and can be omitted in repeated execution of S3 to S8. The process of inquiring of the user about deceleration may also be omitted in repeated execution of S3 to S8.

In the present embodiment, the reliability of recognition result is used as an index of the recognition accuracy. The index of recognition accuracy is not limited to the reliability of recognition result. The index of recognition accuracy may adopt the miss rate. The miss rate also corresponds to the evaluation value of the recognition accuracy. The criteria used in S8 for determining further deceleration may be an index that indirectly indicates the recognition accuracy. For example, in S8, the process may determine whether the estimation error is within a predetermined allowable range. That is, the estimation error may also be included in the evaluation value of recognition accuracy.

An upper limit of allowable range set for the estimation error (hereinafter referred to as error threshold Pth) may be set to 0.5 meters or 1 meter as an example. The error threshold Pth may be set to a different value corresponding to the road type. For example, the error threshold Pth1 of large-scale road, such as intercity highway that has upper limit speed of 70 km/h or more may be set to greater value than the error threshold Pth2 of general road or local highway. For example, the error threshold Pth1 may be set to 1 meter to 3 meters. The error threshold Pth2 may be set to less than 1 meter. For example, the error threshold Pth2 may be set to 0.5 meters. By setting the error threshold value Pth2 for general road stricter than the error threshold value Pth1 for large-scale road, it is possible to reduce the possibility of exceeding a stop line on the general road.

In S9, the position estimation cycle and the target speed set in the above process are maintained, and the process proceeds to S10. In S10, the process determines whether the environment is still adverse. Whether the environment is still adverse can be determined by the same method as the determination in S2. When determining in S10 that the environment is still adverse, the processes returns to S8 and executes S8 and the subsequent step. When determining in S10 that the environment is no longer adverse, the process proceeds to S11. In S11, the various setting values that were temporarily changed in S1 to S9 are reset to the default values, and the process shown in FIG. 6 is ended.

For example, the acceleration for returning to the speed before deceleration may be set to 0.5 m/s^2. When a magnitude of acceleration is set the same as that of deceleration, the occupant is less likely to feel discomfort during acceleration compared with the deceleration. This is because the body of occupant is supported by the backrest of the seat. The magnitude of acceleration applied during speed recovery may be set larger than the magnitude of deceleration. For example, the control target value during acceleration may be set to 0.8 m/s^2 or 0.9 m/s^2. A Jerk (derivative of acceleration), which indicates the time rate of change in acceleration, is controlled within a range from 1.0 m/s^3 to 1.5 m/s^3 from the viewpoint of ride comfort. For example, the jerk may be controlled at 1.3 m/s^3.

The target speed for speed recovery refers to the target speed of ACC used in execution of S1, that is, the value of ACC target speed set by the user. For description convenience, the value of ACC target speed set by the user is referred to as original target speed. The deceleration request unit F8 may output, for example, a speed recovery permission signal for permitting recovery to the target speed to the driving assist ECU 30 in order to start recovering to the original target speed. The driving assist ECU 30 gradually increases the vehicle speed to the target speed with the above acceleration based on the input of the speed recovery permission signal. The recovery of traveling speed may be started by stopping the output of deceleration request signal.

According to the above configuration, the vehicle speed is suppressed when the surrounding environment of the vehicle is determined as the adverse environment. When the vehicle speed decreases, the resolution of image will be improved, thereby improving the image recognition accuracy. When the image recognition accuracy is improved, it is possible to detect relatively distant landmarks and reduce the miss rate of landmarks caused by overlooking. Since the probability of successful detection of landmark is improved as described above, it is possible to increase a chance of executing the localization process. As a result, it is possible to suppress the deterioration in vehicle position estimation accuracy even in an adverse environment.

When the image recognition accuracy of the front camera 11 is improved, the accuracy of the landmark observation coordinates is also improved. Thus, the estimation accuracy of subject vehicle position can be improved by the localization process. As described above, according to the above configuration, it is possible to suppress the deterioration in position estimation accuracy even in an adverse environment. Thus, it is possible to improve the driving safety in the adverse environment.

During a period from the recognition start of landmark to the passing of the landmark, the traveling speed is restricted in response to the surrounding environment of subject vehicle being determined as adverse environment. Compared with a configuration in which the traveling speed is not restricted, the duration from the recognition start of landmark to the passing of the landmark can be increased. According to this configuration, it is possible to increase the number of execution times, that is, execution opportunities of the localization process compared with a configuration in which the traveling speed is not restricted. As a result, it is possible to further suppress the deterioration in vehicle position estimation accuracy.

In the above configuration, the position estimation cycle, that is, the execution cycle of the localization process is shortened when the adverse environment is determined. With this configuration, the number of times the localization process is executed per unit time can be increased. Thus, even when a success rate of localization process decreases, the number of successful localization process within a certain time period can be maintained at the same level as a case where the environment is not determined as adverse environment As a result, it is possible to suppress the deterioration in vehicle position estimation accuracy.

In the autonomous driving, it is assumed that the deterioration in estimation accuracy of the subject vehicle position will cause an interrupt of autonomous driving. When the autonomous driving function is frequently interrupted, the user experience and user convenience of the autonomous driving function will be substantially deteriorated. With consideration of such concerns, according to the above configuration, since the estimation accuracy of the subject vehicle position is less likely to be deteriorated even in adverse environment, the autonomous driving is less likely to be interrupted by the deterioration in estimation accuracy of subject vehicle position. The configuration of restricting the traveling speed based on the adverse environment determination corresponds to a configuration that restricts a function in response to the environment being determined as the adverse environment. The configuration that restricts a function in response to the environment being determined as the adverse environment may further include prohibiting of overtaking, decrease of allowable magnitude of acceleration defined in a control plan, a decrease of allowable value of yaw rate by a predetermined amount. The driving assist ECU 30 is configured to make the upper limit values of the acceleration/deceleration and the yaw rate used in the control plan smaller by predetermined amounts than predetermined standard upper limit values when the position estimator 20 determines that the environment is adverse. The standard upper limit value refers to the upper limit value that is applied when the environment is not determined to be adverse.

While the embodiments of the present disclosure have been described above, the present disclosure is not limited to the embodiments described above, and various modifications to be described below are included in the technical scope of the present disclosure, and may be implemented by various modifications within a scope not departing from the spirit of the present disclosure, in addition to the modifications to be described below. For example, various modifications to be described below may be executed in combination as appropriate within a scope of the present disclosure that does not cause technical inconsistency. The components having the same functions as those described in the embodiment described above are denoted by the same reference symbols, and description of the same components will be omitted. When only a part of a configuration is described, the remaining parts of the configuration may employ a preceding configuration described in the embodiment.

(Deceleration Control Method)

The deceleration request unit F8 may instruct the driving assist ECU 30 to decelerate to a predetermined provisional target speed in response to the environment being determined to be adverse. As the provisional target speed, the speed limit or a value smaller than the speed limit by a predetermined amount can be used. When the recognition accuracy does not reach the allowable level even though the traveling speed is decreased to the provisional target speed, the deceleration request unit F8 may further reduce the provisional target speed by a predetermined amount.

When the recognition accuracy does not reach the allowable level even though the traveling speed is decreased to the speed limit or to the value smaller than the speed limit by the predetermined amount, the position estimator 20 does not request further deceleration. In this case, a different method may be used to improve the recognition accuracy. Examples of the different method other than deceleration may include shortening of the estimation cycle, utilization of the millimeter wave radar 12 (to be described later), and change of image frames used for localization process. When a preceding vehicle exists, even though the speed of preceding vehicle is lower than the target speed of own vehicle, for driving safety purpose, the vehicle may be controlled to follow the preceding vehicle without overtaking the preceding vehicle.

In the above description, the deceleration is started in response to the environment being determined to be adverse. In some situations of actual traveling environment, with consideration of traffic rules and cooperative relationship with different vehicles, it is not proper to immediately perform the deceleration in response to the environment being determined to be adverse. The situation in which the immediate deceleration is not proper may include a situation in which the subject vehicle is traveling in a lane for overtaking purpose, or the subject vehicle is traveling in an acceleration purpose lane for entering the main traveling lane of highway.

With consideration of above situations, the deceleration request unit F8 may determine whether the subject vehicle is traveling in a lane for overtaking purpose or the like when determining whether the deceleration is allowed in S3. The deceleration request unit F8 may determine that deceleration is not allowed when the vehicle is traveling in the lane for overtaking purpose. When the subject vehicle is traveling in the lane for overtaking purpose, the start of deceleration may be hold and delayed until the subject vehicle moves to the normal traveling lane different from the overtaking lane. Suspending the start of deceleration corresponds to suspending the output of deceleration request signal.

Figure 8:
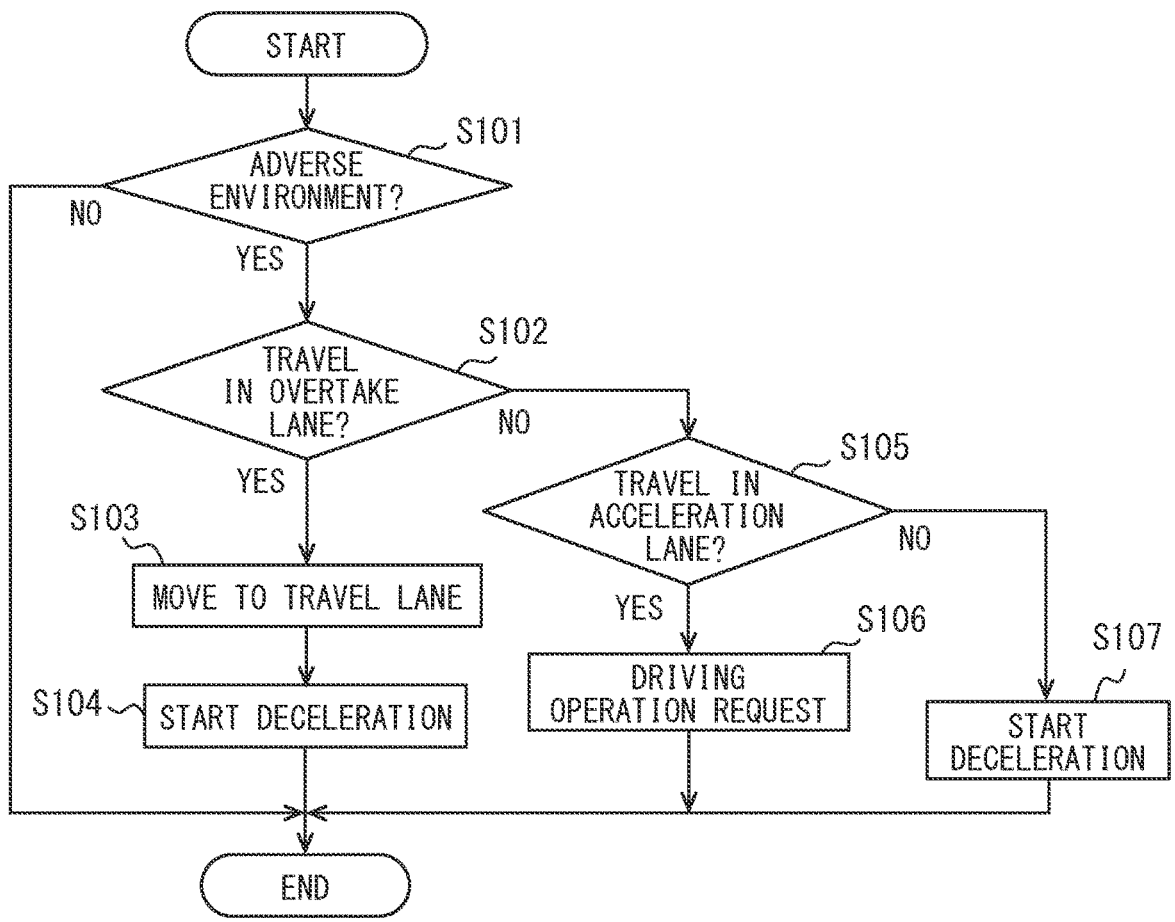
FIG. 8 is a flowchart showing an example of deceleration arbitration process.

The following will describe an operation example of the position estimator 20 corresponding to the technical idea described above with reference to the flowchart shown in FIG. 8. The process shown in FIG. 8 may be executed in parallel with, in combination with, or partially instead of the process in S3 and subsequent to S3 shown in FIG. 6. For example, the flowchart shown in FIG. 8 may be executed as the process after completion of S2 in FIG. 6. For description convenience, the process shown in FIG. 8 is referred to as a deceleration arbitration process. The deceleration arbitration process includes S101 to S107 as an example. For example, each step shown in FIG. 8 may be executed by the processing unit 21, and the processing unit functions as the deceleration request unit F8 by executing the process shown in FIG. 8. The execution subject of each step may be changed as appropriate.

In S101, the process acquires determination result from the adverse environment determination unit F6, determines whether the current driving environment is an adverse environment. When determining that the environment is adverse, the process proceeds to S102. When determining that the environment is not adverse, the process shown in FIG. 8 is ended. In S102, the process determines whether the vehicle is traveling in an overtaking lane based on the ego lane ID specified by the detailed position calculation unit F7.

The overtaking lane refers to a lane for overtaking a different vehicle by passing lateral side of different vehicle. Generally, lanes other than the overtaking lane are referred to as traveling lanes. In the present disclosure, lanes other than the overtaking lane are also referred to as traveling lanes. The setting of the overtaking lane is determined by the traffic rules of the area where the vehicle equipped with the driving assist system 1 is used. For example, in Japan where left-hand traffic for driving is required, the rightmost lane corresponds to the overtaking lane, and the leftmost lane corresponds to the traveling lane. In Germany or the like, where vehicles drive on the right side, the rightmost lane corresponds to the traveling lane, and the leftmost lane corresponds to the overtaking lane. Which lane corresponds to the overtaking lane may be registered in the map data, or may be determined by usage area information set in the position estimator 20, lane information recognized by the front camera 11, or the like. A country code or a region code may be used as the usage area information.

For example, in S102, the process may determine whether the ego lane corresponds to the overtaking lane by comparing the ego lane ID with the number of lanes of the traveling road indicated by the map data. When the ego lane corresponds to the overtaking lane, the process proceeds to S103. When the ego lane does not correspond to the overtaking lane, the process proceeds to S105.

In S103, in cooperation with the driving assist ECU 30, the process executes a lane change from the overtaking lane to the traveling lane. For example, the deceleration request unit F8 may output, to the driving assist ECU 30, a signal requesting lane change of the subject vehicle from the overtaking lane to the traveling lane. In response to a receiving of the request signal, the driving assist ECU 30 generates and executes a plan for the lane change of subject vehicle. The lane change may be performed (that is, automatically) by, for example, the driving assist ECU 30 as the subject of driving operation. In one aspect, such a control mode corresponds to control of returning to the traveling lane by canceling the planned overtaking in response to the environment being determined to be adverse for the camera. As another aspect, when a calculation result indicates that the overtaking can be completed within a predetermined time, the control for returning to the traveling lane may be started after the overtaking is completed.

When the driving assist ECU 30 mainly performs steering operation, the driving assist ECU 30 may allow the occupant in the driver seat to release the steering wheel, or maintain a slightly gripped state of the steering wheel by the occupant in the driver seat. The driving operation for lane change may be performed mainly by the occupant in the driver seat. In this case, the driving assist ECU 30 can perform driving assist control, such as suggestion of a lane change, presentation of traffic condition of a destination traveling lane after the lane change is made, steering torque assistance, or the like.

Figure 9:
FIG. 9 is a diagram showing an example of an overtake stop notification image.
Figure 9:

When performing the lane change of the subject vehicle to the traveling lane, the process may further include inquiring of the occupant in the driver seat to confirm whether to execute the lane change. For example, the position estimator 20 or the driving assist ECU 30 may output an overtaking stop notification image shown in FIG. 9. The overtaking stop notification image notifies that the vehicle will return to the traveling lane. When the occupant in the driver seat makes a response to the inquiry, that is, the overtaking stop notification image, whether to actually execute the overtaking may be determined. The position estimator 20 may determine that returning to the traveling lane is permitted when no response is made by the occupant in driver seat to the display of overtaking stop notification image. The overtaking stop notification image may include a message requesting the occupant in driver seat to perform the driving operation when the occupant in driver seat wants to continue traveling in the overtaking lane. After the overtaking stop notification image is displayed, the position estimator 20 may determine that the lane change is rejected by the occupant in the driver seat when an operation made by the occupant in driver seat, such as stepping on the accelerator pedal is detected.

The deceleration request unit F8 outputs a lane change request signal to the driving assist ECU 30 when the occupant in driver seat permits lane change to the traveling lane. When the occupant in driver seat refuses the lane change to traveling lane, the occupant in driver seat may be notified that it is difficult to continue driving assist by the system, such as automatic adjustment of traveling speed, or a stop of the driving assist.

After the lane change to the traveling lane is completed, the process proceeds to S104. Completion of movement to the traveling lane can be determined based on the recognition result of the front camera 11, for example, when the ego lane ID is changed to 1 or the like. In S104, the process outputs a deceleration request signal to the driving assist ECU 30, and the process is ended. The deceleration request signal may be output repeatedly until the recognition accuracy reaches an allowable level. As another example, the deceleration request signal may be output only once. The deceleration request signal may be a signal that instructs deceleration to a predetermined provisional target speed, such as a speed limit.

In S105, the process determines whether the vehicle is traveling in the acceleration lane by comparing the ego lane ID with the road structure information indicated by the map data. When the vehicle is determined to be traveling in the acceleration lane, an affirmative decision is made in S105 and the process proceeds to S106. When the vehicle is determined to be traveling in a lane other than the acceleration lane, the process proceeds to S107.

In S106, in cooperation with the HMI system 17, the process outputs an image and a voice requesting the occupant in driver seat to manually adjust the traveling speed and steering wheel. Then, the process is ended. According to this configuration, it is possible to avoid an unintentional deceleration by the system in a scene where the vehicle is required to be accelerated. Further, driving safety can be ensured by promptly transferring the driving authority to the occupant in driver seat when it is difficult for the system to maintain the traveling speed or to accelerate. The above-described content executed in S106 is an example, and the control executed during traveling in the acceleration lane is not limited to the above configuration. When a traffic volume on the main traveling lane is less than a predetermined level and entrance to the main traveling lane is possible with a speed lower than the normally applied target speed for merging in the main traveling lane, the deceleration process is stopped and the acceleration process to a predetermined traveling speed for merging in the main traveling lane can be selected. The normally applied target speed for merging in the main traveling lane may be set to the speed limit of the main traveling lane or the speed set by the user.

In S107, similar to S104, the process outputs a deceleration request signal to the driving assist ECU 30, and the process is ended. The above-described process executed in S105 and S106 may be optional or omitted. In this case, when the process determines, in S102, that the ego lane is not the overtaking lane, the process proceeds to S107, and starts the deceleration control in S107. According to the above configuration, it is possible to reduce the possibility that deceleration is automatically started in response to the environment being determined to be adverse even in a situation where the deceleration should not performed.

(Speed Recovery Control)

In the above description, when the process determined in S10 that the environment is no longer adverse, the restricted traveling speed is recovered to the original speed in S11. In some situation of actual driving environment, acceleration is not desirable from the viewpoint of traffic rules and cooperation with other vehicles. A traffic scene in which it is not desirable to perform acceleration may include, for example, a case where a curved road or an obstacle exists within a predetermined distance ahead of the subject vehicle, or a case where a distance from the subject vehicle to the preceding vehicle is within a predetermined distance. The obstacle referred to here may include lane restriction due to construction work, fallen objects, vehicles parked on the road, vehicles in accidents, and the like.

In such circumstances, the position estimator 20 may determine whether to perform acceleration based on the road structure ahead of the subject vehicle when the environment is no longer determined to be adverse. For example, when the remaining distance to the curve road is less than a predetermined threshold, the acceleration may be suspended. For example, suspending start of acceleration corresponds to suspending the output of speed recovery permission signal.

Figure 10:
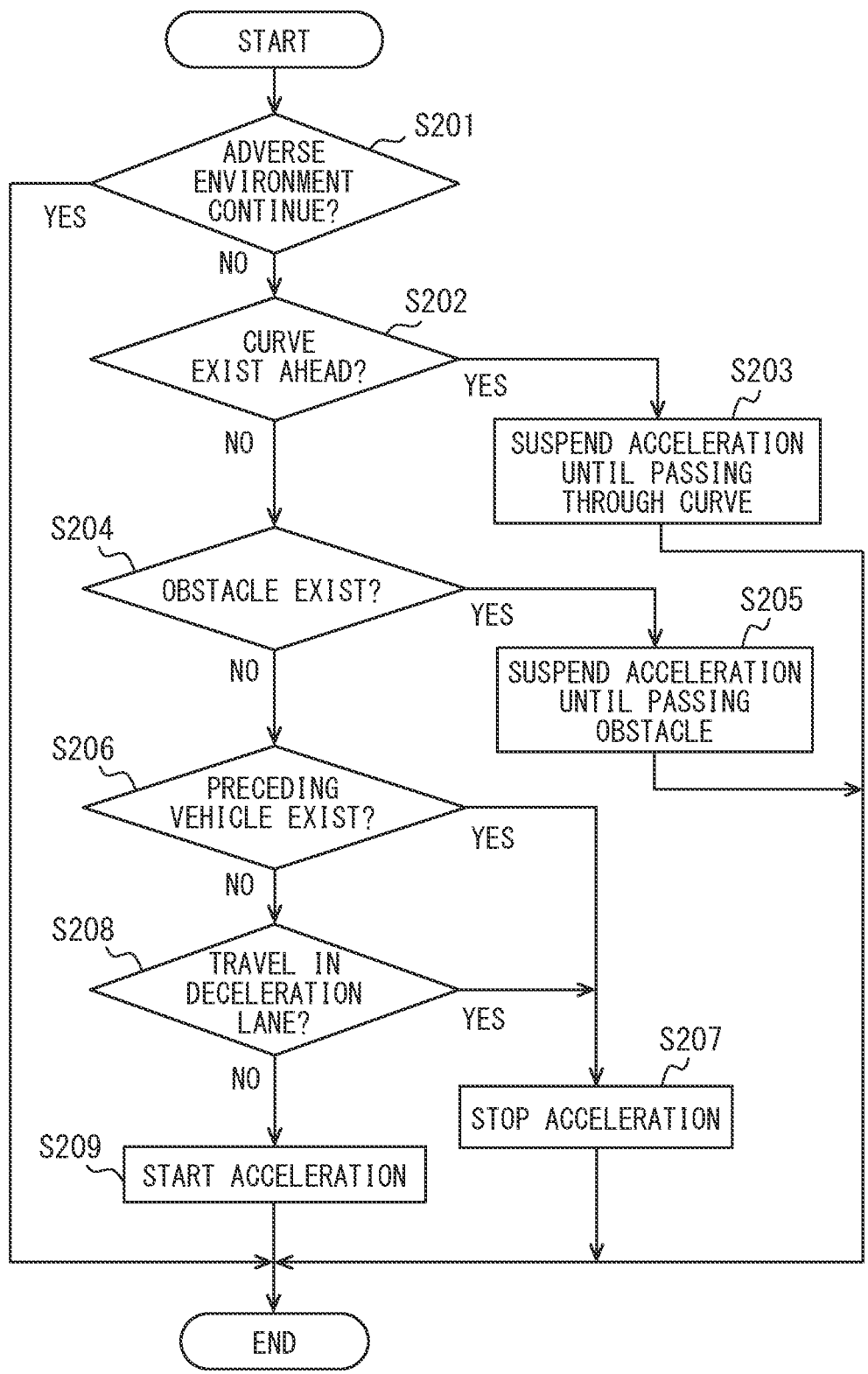
FIG. 10 is a flowchart showing an example of acceleration arbitration process.

The following will describe an operation example of the position estimator 20 corresponding to the technical idea described above with reference to the flowchart shown in FIG. 10. The process shown in FIG. 10 may be executed in parallel with, in combination with, or partially instead of the process in S11 shown in FIG. 6. For example, the flowchart shown in FIG. 10 may be executed as the process of S11 in FIG. 6. For description convenience, the process shown in FIG. 10 is referred to as a deceleration arbitration process. The deceleration arbitration process includes S201 to S209 as an example. The deceleration arbitration process can be executed at a predetermined cycle (for example, every one second) while the traveling speed is restricted due to the determination of adverse environment. For example, each step shown in FIG. 10 may be executed by the processing unit 21.

In S201, the process acquires determination result from the adverse environment determination unit F6, and determines whether the adverse environment is continued. When determining that the environment is still adverse, an affirmative determination is made in S201, and the process is ended. When determining that the environment is not adverse any more, the process proceeds to S202.

In S202, the process determines whether a curved road exists within a predetermined distance ahead of the subject vehicle by referring to the map data. The determination in S202 corresponds to a process of determining whether the remaining distance to the curved road, which is calculated using the map data, is less than a predetermined threshold. When determining that a curved road exists within the predetermined distance ahead of the subject vehicle, the process proceeds to S203. When determining that a curved road does not exist within the predetermined distance ahead of the subject vehicle, the process proceeds to S204. In S203, the process determines to suspend the acceleration, which recovers the vehicle speed to the original target speed, until the vehicle passes through the curved road, and the process shown in FIG. 10 is ended. As described above, the original target speed refers to the user-set vehicle speed or the speed limit of the traveling road. Even when the acceleration to the original target speed is suspended, if there exists a preceding vehicle, acceleration may be performed so as to maintain a predetermined inter-vehicle distance in response to the behavior of the preceding vehicle.

In S204, based on the signals input from the front camera 11 and the millimeter wave radar 12, the process determines presence of an obstacle. When an obstacle is detected by the front camera 11 or the millimeter wave radar 12, the process proceeds to S205. When no obstacle is detected by the front camera 11 or the millimeter wave radar 12, the process proceeds to S206. In S205, the process determines to suspend the acceleration, which recovers the vehicle speed to the original target speed, until the vehicle passes through the detected obstacle, and then the process is ended.

In S206, the process determines a presence of preceding vehicle based on the signals input from the front camera 11 and the millimeter wave radar 12. When the preceding vehicle is detected, the process proceeds to S207. When the preceding vehicle is not detected, the process proceeds to S208. When the preceding vehicle is detected and the distance to the preceding vehicle is equal to or greater than the predetermined following traveling distance, the process may deem that no preceding vehicle related to ACC exists, and the process may proceed to S208. The predetermined following traveling distance may be a constant value, such as 60 meters or 100 meters, or may be defined using inter-vehicle time in dynamic manner corresponding to traveling speed. For example, the following traveling distance may be set to 2 seconds or 3 seconds corresponding to the traveling speed of the subject vehicle.

In S207, the process stops the acceleration toward the original target speed. In this case, the driving assist ECU 30 may start a vehicle speed control in order to travel following the preceding vehicle. In S208, the process determines whether the vehicle is traveling in the deceleration lane by comparing the ego lane ID with the road structure information indicated by the map data. When the vehicle is determined to be traveling in the deceleration lane, the process proceeds to S207 and stops the acceleration in S207. When the vehicle is determined to be traveling in a lane other than the deceleration lane, the process proceeds to S209. Note that the determination in S208, that is, the determination as to whether the driving position is in the deceleration lane may be omitted with consideration of any additional factor.

In S209, the driving assist ECU 30 starts acceleration toward the target speed, that is, acceleration for recovering to the original target speed. For example, the deceleration request unit F8 outputs the speed recovery permission signal to the driving assist ECU 30.

With consideration of passenger comfort, driving safety, or other factors, the deceleration is necessary to be made while traveling the curved road or before entering the curved road. When passing by an obstacle, deceleration is also necessary to be made in preparation for unexpected jumping out of an object. When the vehicle performs the acceleration in response to the cancellation of the adverse environment determination, the vehicle needs to decelerate again when there is a curved road or an obstacle ahead of the subject vehicle. That is, unnecessary acceleration or deceleration may occur. According to the above configuration, when a curve or an obstacle exists ahead of the subject vehicle, the acceleration for recovering the vehicle speed to the original target speed is suspended. Thus, it is possible to suppress unnecessary acceleration.

(Deceleration in Response to Determination of Adverse Environment)

The landmark information acquisition unit F3 may identify the closest landmark in front of the vehicle by referring to the map data, and calculate the distance between the subject vehicle and the closest landmark in front of the subject vehicle as a closest landmark distance. The closest landmark refers to a landmark closest to the subject vehicle in front direction of the subject vehicle among the landmarks registered in the map data. The deceleration request unit F8 may execute a process related to deceleration when the closest landmark distance is less than a predetermined distance. The deceleration related process may include inquiring of the occupant in the driver seat whether to restrict the vehicle speed, output of a deceleration request signal, and the like.

The amount of deceleration based on the determination of adverse environment may be changed according to the type of adverse environment. The type specification unit F61 may specify the type of adverse environment. For example, the amount of deceleration when the type of adverse environment is determined to be the heavy rain may be set larger than the amount of deceleration when the type of adverse environment is determined to be the afternoon sun or fog. According to this configuration, it is possible to apply an appropriate deceleration amount according to the type of adverse environment.

The deceleration amount based on the determination of adverse environment may be changed according to an adverse environment level. As described above, the adverse environment level determination unit F62 may determine the adverse environment level. For example, the deceleration amount may be increased with an increase of the adverse environment level. According to this configuration, it is possible to apply an appropriate deceleration amount according to the adverse environment level.

When the adverse environment determination unit F6 determines the adverse environment, an affective range may be set based on the type of adverse environment. For example, the position estimator 20 may properly change the control content to be executed corresponding to the affective range of the adverse environment. For example, when the affective range of the adverse environment is set to several tens of meters or several hundreds of meters and the vehicle can travel through the affective range within a few minutes, the deceleration may be executed. For another example, when the affective range of the adverse environment is set to several tens of kilometers and the vehicle needs to travel for ten minutes or longer to get out of the affective range, the ACC may be stopped or the system may inquire, in cooperation with the HMI system 17, the occupant in driver seat whether to continue ACC function after executing the deceleration. For example, in the case of heavy rain, the affective range may be estimated based on a size of the rain cloud that causes the heavy rain and a movement prediction information of the rain cloud. The size and movement prediction information of rain cloud may be obtained from an external server that distributes weather information via, for example, the V2X onboard device 15. According to the configuration in which the countermeasure is differentiated according to the size of the affective range, it is possible to adopt a countermeasure according to the preference of the occupant in the driver seat. The countermeasure for the size of the affective range, the type of adverse environment, and the adverse environment level may be set by the driver. According to this configuration, the occupant in the driver seat may be highly satisfied with the behavior of the vehicle.

(Localization Process)

The localization unit F0 may be configured to change the factors used for the localization process based on whether the adverse environment determination unit F6 has determined that the surrounding environment corresponds to an adverse environment.

For example, based on whether the environment is determined to be adverse or not, the localization unit F0 may determine whether to use the detection result of the millimeter wave radar 12 in the localization process. As a more specific example, the localization unit F0 may switch between using and not-using of the detection result of the millimeter wave radar 12 based on whether the environment is determined to be adverse or not. The landmark position information is used in calculation of the observation coordinates of landmark and the localization process. Thus, changing the factors used in the calculation of the observation coordinates of landmark corresponds to changing factors used in the localization process.

Specifically, when the adverse environment determination unit F6 determines that the surrounding environment is not adverse, the localization unit F0 calculates the observation coordinates of the landmark without using the detection result of the millimeter wave radar 12, and performs the localization process. When the adverse environment determination unit F6 determines that the surrounding environment is adverse, the localization unit F0 calculates the observation coordinates of the landmark using both of the detection result of the millimeter wave radar 12 and the recognition result of the front camera 11, and performs the localization process. With this configuration, localization process is performed without using the detection result of the millimeter wave radar 12 under a normal environment, and the localization process is performed by using both of the detection result of the millimeter wave radar 12 and the detection result of the front camera 11 under an adverse environment.

According to the above configuration, the localization unit F0 executes the localization process without using the detection result of the millimeter wave radar 12 when the environment is determined to be not adverse (that is, normal environment). Thus, processing load in the processing unit 21 can be reduced. Under adverse environment, localization process is performed using the observation coordinates of landmarks calculated by the sensor fusion, that is, combination of the detection results of millimeter wave radar and camera. Thus, it is possible to suppress the deterioration in position estimation accuracy caused by rainfall or the like.

When the landmark is detected by combining the image recognition result and the radar detection result, the landmark information acquisition unit F3 may add a variable weight to the radar detection result in response to the environment being determined to be adverse in the landmark detection process. The image recognition result indicates the position or type of detection target existing in the imaging range of the front camera 11. The image recognition result is generated by inputting image data captured by the front camera 11 into a predetermined identifier. The radar detection result indicates the relative position, type, or moving speed of an object existing ahead of the subject vehicle. The object existing ahead of the subject vehicle can be detected by the millimeter wave radar 12 or LiDAR.

For example, when the adverse environment determination unit F6 determines that the environment is adverse, the weight of the radar detection result used in calculation of the landmark position may be increased compared to the weight used in normal environment. Since the millimeter wave radar 12 is not easily affected by rain, fog, or the like, it is possible to maintain the estimation accuracy of the distance to landmark at a high level by increasing the weight of radar detection result. Alternatively, when the position of the landmark is calculated by the sensor fusion of the front camera 11 and the millimeter wave radar 12, the weight of the image recognition result may be decreased (for example, set to zero). For a predetermined time period after the successful sensor fusion, as long as the millimeter wave radar 12 can track the landmark, the position of the landmark is calculated and updated based on the radar detection result. In adverse environment, such as rainy weather condition, the recognition ability of front camera 11 is deteriorated. According to above configuration, the occurrence frequency of an event in which the position of landmark cannot be specified can be suppressed. As a result, it is possible to suppress deterioration in localization process accuracy.

The position estimator 20 may be configured to change the images used for the localization process based on whether the adverse environment determination unit F6 has determined that the surrounding environment corresponds to an adverse environment. The change of image frame used for localization process may be executed in cooperation with the front camera 11. The localization process uses the landmark position information acquired based on image recognition. Thus, changing of the image frame used in the landmark detection corresponds to changing of the image frame used in the localization process. Detection of landmark also includes specifying of the position and type of landmark.

Figure 11:
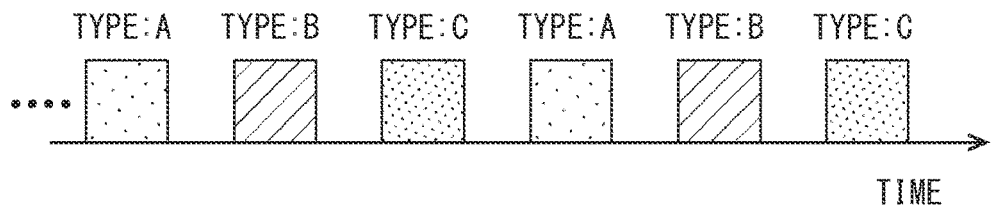
FIG. 11 is a diagram for explaining an operation of the front camera.

For example, as shown in FIG. 11, the front camera 11 may generate multiple types of frames with different exposure periods in a predetermined order. The A type image frame shown in FIG. 11 is a landmark frame captured with an exposure time suitable for the landmark detection. The B type image frame is captured with an exposure time suitable for, for example, vehicle detection. The C type image frame is captured with an exposure time suitable for, for example, lane boundary line. The type of image frame generated by the front camera 11 is not limited to the examples shown in FIG. 11. For example, an image frame for pedestrian detection or an image frame for detecting lighting equipment, such as headlight and traffic signal may also be generated by the front camera. For convenience, an image frame for detecting an object other than the landmark, such as an image frame for vehicle detection, is referred to as a different use purpose frame.

When the front camera 11 generates multiple different types of image frames with different use purposes and different exposure periods, the localization unit F0 selects type and combination of image frames to be used for landmark detection depending on whether the environment is determined to be adverse or not. For example, in a normal environment, the localization process is performed by using only the image frame for landmark detection purpose. In an adverse environment, in addition to the localization process using the image frame for landmark detection purpose, a localization process using different use purpose frame may also be executed. According to the configuration in which the additional localization process is executed using the different use purpose frame, the execution frequency of localization process can be increased, as twice. That is, the execution interval of localization process can be shortened.

When the environment is determined to be adverse, the localization unit F0 generates an image frame (hereinafter referred to as a super resolution frame) in which the resolution is increased by combining the landmark frame and the different use purpose frame, and performs the localization process using the super resolution frame. The super resolution frame can be generated by various methods of super resolution techniques, such as a fractal method, a self-similarity method, or the like. As a premise of the above configuration, the identifier G1 is configured to be capable of detecting the landmark from the different use purpose frame, such as image frame for vehicle detection or super resolution frame.

The driving assist system 1 may include multiple camera elements having different view angles as the front camera 11. For example, as shown in FIG. 12, the front camera 11 may include three camera elements, such as a middle range camera 11a, a telephoto camera 11b, and a wide angle camera 11c. The middle range camera 11a has a view angle of about 50 degrees, and includes a lens capable of capturing an image up to a distance of, for example, 150 meters. The telephoto camera 11b has a relatively narrow view angle so as to be able to capture an image of a farther distance than the middle range camera 11a. For example, the telephoto camera 11b has a view angle within a range of 30 degrees to 40 degrees, and is capable of capturing an image up to a distance of 250 meters or farther. The wide angle camera 11c captures images within a wide area around the vehicle. The wide angle camera 11c has a view angle within a range of, for example, 120 degrees to 150 degrees, and is capable of capturing an image within 50 meters ahead of the vehicle.

As described above, when the vehicle is equipped with multiple camera elements as the front camera 11, the localization unit F0 switches the source of the image frames used for landmark detection depending on whether the environment is determined to be adverse or not. For example, the image frame generated by the middle range camera 11a is used to detect the landmark in normal environment. The image frame generated by the telephoto camera 11b is used to detect the landmark when the vehicle is exposed to the afternoon sun. Since the telephoto camera 11b has a relatively narrow angle, it is less susceptible to the afternoon sun than the middle range camera 11a, which has a wide view angle. Therefore, when the vehicle is exposed to the afternoon sun or backlight, by switching the camera used for localization process to the telephoto camera 11b having relatively narrow angle, the deterioration in landmark recognition accuracy can be suppressed. Instead of completely switching the front camera 11 used for localization process, only the middle range camera 11a may be used in the normal environment, and the middle range camera 11a and the telephoto camera 11b may be used together in the adverse environment, such as backlight or afternoon sun. When the front camera 11 includes multiple different types of camera elements, the localization unit F0 may change the combination of camera elements of front camera 11 to be used for the localization process depending on whether the environment is determined to be adverse or not.

The driving assist system 1 may include a LiDAR, which has a detection range covering a front area of the vehicle. The LiDAR is a device that generates three-dimensional point cloud data indicating a position of a reflection point in each detection direction by emitting laser light. Three-dimensional point cloud data corresponds to observation data for the LiDAR. The detection result of LiDAR whose detection range includes the front area of the vehicle can also be used for localization process in the same manner as the detection result of the millimeter-wave radar described above.

As described above, a process temporarily adopted in the adverse environment (hereinafter referred to as adverse environment countermeasure process) may include the restriction of vehicle speed, shortening of position estimation cycle, change of combination weight of the detection result detected by the millimeter wave radar 12, and change of the image frame used for the landmark detection. The content actually adopted as the adverse environment countermeasure process may be appropriately selected, and it is not necessary to execute all of the above-described countermeasures at the same time. One or partial of the above-described countermeasures may be executed when the environment is determined to be adverse. For example, when the vehicle is determined to be in an adverse environment, deceleration may be performed without changing the position estimation cycle.

The combination of adverse environment countermeasure processes to be executed may be changed according to the level of adverse environment. For example, when the adverse environment corresponds to level 1 (low level), the position estimation cycle is shortened. When the adverse environment corresponds to level 2 or higher (high level), the vehicle speed is restricted in addition to the shortening of the position estimation cycle. When the adverse environment corresponds to level 3, the restriction amount of vehicle speed (that is, the amount of deceleration) may be increased than the amount of deceleration made in the case of level 2. The position estimation cycle may be shortened in response to an increase in level of the adverse environment.

The combination of adverse environment countermeasure processes to be executed may be changed according to the type of adverse environment. For example, when the type of adverse environment is fog, the position estimation cycle is shortened. When the type of adverse environment is heavy rain, the vehicle speed is restricted in addition to the shortening of the position estimation cycle. When the type of adverse environment is late afternoon sun, the image frame used for localization process is changed together with the shortening of execution cycle of localization process. Changing the image frame used for localization process may include switching the image frame used for localization process from the image frame captured by the middle range camera 11a to the image frame captured by the telephoto camera 11b. Changing the image frame used for localization process may also include generation of the super resolution frame and using the generated super resolution frame in the localization process.

The super resolution frame may be generated by adding information about the different use purpose frame to the localization use purpose frame generated by one camera element included in the front camera 11 (for example, the middle range camera 11a). The super resolution frame may be generated by combining the image frame generated by the telephoto camera 11b with the image frame generated by the middle range camera 11a. The images used for super resolution processing may be multiple frames generated by the same camera element, or may be multiple frames generated by different camera elements. When the super resolution frame is generated by combining the image of the middle range camera 11a and the image of the telephoto camera 11b, the information of the distant area, which the middle range camera 11a is not good at, can be acquired from the image generated by the telephoto camera 11b. As a result, the effective recognition distance of the landmark positioned within middle range to the distant range can be improved.

The position estimator 20 may request stop of the ACC function when the position estimation error exceeds a predetermined threshold even though the adverse environment countermeasure process is executed. In a case were the subject vehicle is capable of performing autonomous driving at level 3 or higher, in response to the position estimation error during the autonomous driving exceeding a predetermined threshold value even though the adverse environment countermeasure process is executed, the position estimator may change, in cooperation with the HMI system 17, the driving authority to the occupant in the driver seat.

(System Configuration)

Figure 13:
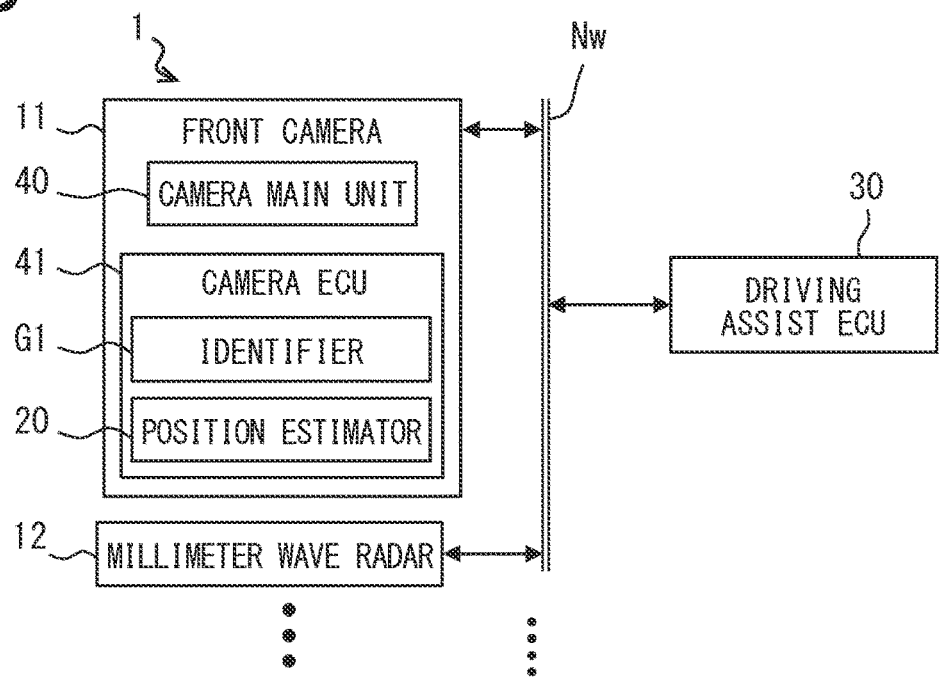
FIG. 13 is a diagram showing a modification of a system configuration.
Figure 14:
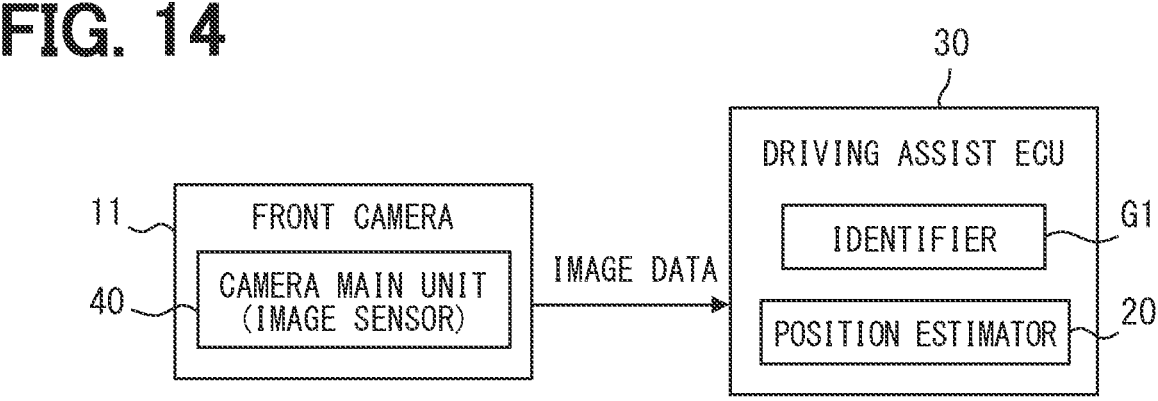
FIG. 14 is a diagram showing a modification of a system configuration.

The configuration in which the position estimator 20 is disposed outside the front camera 11 is described in the above embodiment. The disposition of the position estimator 20 is not limited to the above-described configuration. As shown in FIG. 13, the function of position estimator 20 may be included in the camera ECU 41. As shown in FIG. 14, the function of the position estimator 20 may be included in the driving assist ECU 30. The driving assist ECU 30 including the function of position estimator 20 corresponds to a traveling control device. The function of the camera ECU 41 (mainly the identifier G1) may also be included in the driving assist ECU 30. That is, the front camera 11 may be configured to output the image data to the driving assist ECU 30, and the driving assist ECU 30 may be configured to execute a process such as the image recognition.

When the driving assist ECU 30 has the function of the position estimator 20, more specifically, the function of the adverse environment determination unit F6, the driving assist ECU 30 performs a process to restrict the vehicle speed in response to the determination of the adverse environment. The driving assist ECU 30, which includes the adverse environment determination unit F6, can voluntarily execute the process of gradually increasing the vehicle speed to the original target speed based on the determination that the adverse environment is no longer detected. The deceleration associated with the adverse environment determination can be suspended until the vehicle, which currently travels in the overtaking lane, moves to the traveling lane. The speed recovery in response to the determination that the adverse environment is no longer detected may be suspended or canceled when an acceleration suspension factor is detected.

Figure 15:
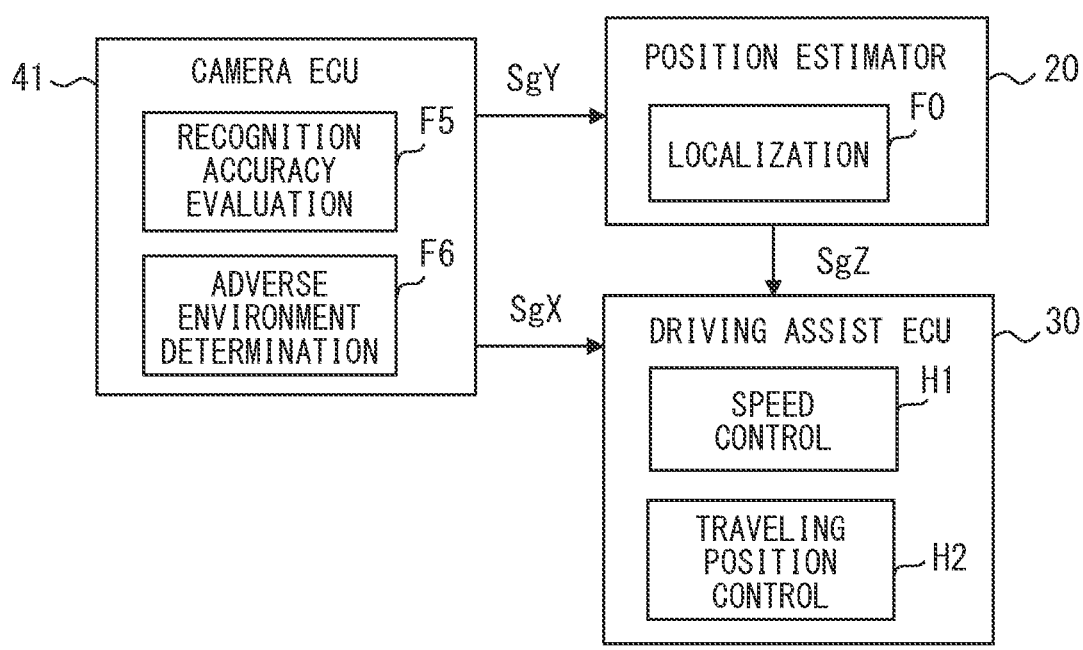
FIG. 15 is a diagram showing a modification of a system configuration.

In addition, as shown in FIG. 15, part of the position estimator 20, for example, the recognition accuracy evaluation unit F5 and the adverse environment determination unit F6 may be included in the camera ECU 41. In this configuration, the camera ECU 41 outputs, to the driving assist ECU 30, an environment determination signal SgX indicating whether the driving environment is adverse for an external camera attached to the vehicle. The environment determination signal SgX may indicate whether the environment is adverse or not by numerical values of 0 and 1. The environment determination signal SgX may indicate at least one of the level or type of adverse environment. In a configuration shown in FIG. 15, the driving assist ECU 30 may suppress and recover the vehicle speed based on the environment determination signal SgX. As shown in FIG. 15, the driving assist ECU 30 includes a traveling position control unit H2, which is a functional unit and controls the traveling position of vehicle in the lateral direction. For example, the traveling position control unit H2 controls a movement of vehicle from the overtaking lane to the traveling lane. As shown in FIG. 15, the camera ECU 41 outputs, to the position estimator 20, a signal SgY indicating the result of landmark recognition. The position estimator 20 outputs, to the driving assist ECU 30, a signal SgZ indicating a result of localization process.

(Driving Assist ECU 30)

The driving assist ECU 30 may automatically execute all driving operations related to traveling of the vehicle. That is, the driving assist ECU 30 may be configured as an autonomous driving device that implements driving control at automated driving level 3 or higher defined by Society of Automotive Engineers of America (SAE International). The automated driving level 1 refers to a level at which the system assists any one of the steering operation, the acceleration operation, or the deceleration operation. The automated driving level 2 refers to a level at which the system assists multiple operations among the steering operation, the acceleration operation, or the deceleration operation. The automated driving level 3 refers to a level at which the system executes all the driving operations within an operational design domain (ODD) that defines a condition under which the autonomous driving is executable. At level 3, the driving authority is transferred from the system to the driver in an emergency situation. The ODD corresponds to autonomous driving permission condition. The autonomous driving level 4 refers to a level at which the system executes all of the driving operations within the ODD. The automated driving level 5 refers to a level at which the system executes all of the driving operations without area limitation. The automated driving level 3 or higher corresponds to an autonomous driving level at which all controls related to the traveling of the vehicle are automatically executed by the system. When the automated driving level is level 3 or higher, the driving assist ECU 30 automatically controls the steering operation, the acceleration operation, and the deceleration operation (that is, braking operation) so that the vehicle travels along the road to a destination set by the occupant in the driver seat or set by another occupant.

Additional Note 1

The control units and methods thereof described in the present disclosure may be implemented by a special purpose computer, which includes a processor programmed to execute one or more functions implemented by computer programs. Alternatively, the device and the method thereof described in the present disclosure may be implemented by a special purpose hardware logic circuit. The device and the method described in the present disclosure may be implemented by one or more special purpose computers which are constituted by combinations of a processor for executing computer programs and one or more hardware logic circuits. The computer program may be stored in a computer readable non-transitory tangible storage medium as computer-executable instructions. For example, the units and/or the functions which are provided by the position estimator 20 may be provided by software stored in tangible memory devices and computers for executing them, only software, only hardware, or a combination thereof. A part or all of the functions of the position estimator 20 may be implemented by hardware. A configuration in which a certain function is implemented by hardware includes a configuration in which the function is implemented by use of one or more ICs or the like. The processing unit 21 may be implemented by an MPU instead of the CPU. The processing unit 21 may be implemented by combining multiple types of calculation processing devices such as a CPU, an MPU, and a GPU. The ECU may be implemented by using a field-programmable gate array (FPGA) or an application specific integrated circuit (ASIC). The various programs described above may be stored in a non-transitory tangible storage medium. As the storage medium of the programs, various storage media, such as a hard-disk drive (HDD), a solid state drive (SSD), an erasable programmable rom (EPROM), a flash memory may be used.

Additional Note 2

The present disclosure also includes the following configurations.

Configuration 1

A vehicle position estimation device, which is mounted on a vehicle and estimates a current vehicle position, comprising:
a control unit (21) configured by at least one processor, wherein
the control unit includes:
a localization unit (F0) performing a process for specifying a position of the vehicle on a map based on (i) position information of a landmark detected based on an image frame captured by a front camera and (ii) position information of the landmark registered in the map; and
an adverse environment determination unit (F6) determining whether a surrounding environment of the vehicle is an adverse environment based on at least one of (i) information output from a sensor equipped to the vehicle or (ii) information output from a communication device equipped to the vehicle, the adverse environment causing a deterioration in a performance of object recognition that is performed using the image frame,
the control unit outputs, to a vehicle control module (30) that automatically controls a traveling speed of the vehicle within a predetermined speed range, a signal that requests a temporary decrease of an upper limit of the predetermined speed range in response to the adverse environment determination unit determining that the surrounding environment of the vehicle is the adverse environment.

According to the above configuration, when determining an adverse environment, the upper limit of the speed range used by the vehicle control module for speed control purpose is decreased. The vehicle control module performs controls for autonomous driving, ACC, or the like. As a result, the traveling speed of the vehicle is restricted in indirect manner. Thus, the resolution of the camera image can be improved, and thereby improving success rate of the localization process and the position estimation accuracy.

Configuration 2

A vehicle position estimation device, which estimates a current vehicle position, comprising:
a control unit (21) configured by at least one processor, wherein
the control unit includes:
a localization unit (F0) specifying a position of a vehicle on a map based on (i) position information of a landmark detected based on an image frame captured by a front camera and (ii) position information of the landmark registered in the map; and
an adverse environment determination unit (F6) determining whether a surrounding environment of the vehicle is an adverse environment based on at least one of (i) information output from a sensor equipped to the vehicle or (ii) information output from a communication device equipped to the vehicle, the adverse environment causing a deterioration in a performance of object recognition that is performed using the image frame;
the control unit outputs, to a vehicle control module (30) that automatically controls a traveling speed of the vehicle, a signal that requests a decrease of target speed set value used for speed control by a predetermined amount in response to the adverse environment determination unit determining that the surrounding environment of the vehicle is the adverse environment.

In the above configuration, the system temporarily decreases the ACC target speed set by the occupant in the driver seat by the predetermined amount in response to the determination of adverse environment. According to this configuration, it is possible to restrict the traveling speed when the vehicle travels without following the preceding vehicle.

Configuration 3

A vehicle position estimation device, which estimates a current vehicle position, comprising:
a control unit (21) configured by at least one processor, wherein
the control unit includes:
a localization unit (F0) performs a process for specifying a position of a vehicle on a map based on (i) position information of a landmark detected based on an image frame captured by a front camera and (ii) position information of the landmark registered in the map; and
an adverse environment determination unit (F6) determining whether a surrounding environment of the vehicle is an adverse environment based on at least one of (i) information output from a sensor equipped to the vehicle or (ii) information output from a communication device equipped to the vehicle, the adverse environment causing a deterioration in a performance of object recognition that is performed using the image frame,
the control unit acquires detection result data from an object detector (12), which detects an object existing in front of the vehicle using a radio wave or a laser light beam,
the localization unit performs the process for specifying the position of the vehicle by combining the image frame captured by the front camera and the detection result data acquired from the object detector, and
the localization unit changes a weight of the detection result data acquired from the object detector in the process for specifying the position of the vehicle in response to the environment determination unit determining that the surrounding environment of the vehicle is the adverse environment.

In the above configuration, the weight of detection result of the millimeter wave radar 12 in sensor fusion is changed depending on whether the environment is determined to be adverse or not. For example, when the surrounding environment is determined to be adverse environment, the weight of detection result of the millimeter wave radar 12 is increased to be larger than the weight of detection result of the millimeter wave radar used in normal environment. The changing of the weight ratio includes a configuration in which the weight of the image recognition result is temporarily set to zero. For example, the detection result of the millimeter wave radar 12 may be increased so that tracking of the landmark can be performed only by the millimeter wave radar 12 for a predetermined period from the previous successful sensor fusion. Alternatively, the weight of the detection result of the millimeter wave radar 12 in the distant area may be increased when the surrounding environment is determined as the adverse environment. How to change the weight of the detection result of the millimeter wave radar 12 in sensor fusion may be properly designed corresponding to the type or the level of adverse environment.

Configuration 4

A vehicle position estimation device, which estimates a current vehicle position, comprising:
a control unit (21) configured by at least one processor, wherein
the control unit includes:
  a localization unit (F0) performing a process for specifying a position of a vehicle on a map based on (i) position information of a landmark detected based on an image frame captured by a front camera and (ii) position information of the landmark registered in the map; and
  an adverse environment determination unit (F6) determining whether a surrounding environment of the vehicle is an adverse environment based on at least one of (i) information output from a sensor equipped to the vehicle or (ii) information output from a communication device equipped to the vehicle, the adverse environment causing a deterioration in a performance of object recognition that is performed using the image frame,
the control unit acquires detection result data from an object detector, which detects an object existing in front of the vehicle using a radio wave or a laser light beam, and
the localization unit executes the process for specifying the position of the vehicle without using the detection result data acquired from the object detector when the adverse environment determination unit determines that the surrounding environment of the vehicle is not the adverse environment,
the localization unit executes the process for specifying the position of the vehicle using both of the image frame captured by the front camera and the detection result data acquired from the object detector when the adverse environment determination unit determines that the surrounding environment of the vehicle is the adverse environment.

According to the above configuration, since the detection result output from the millimeter wave radar 12 is not used in the normal environment, the processing load can be reduced. In the adverse environment, the detection result output from the millimeter wave radar 12 is used in addition to the camera recognition result. Thus, recognition accuracy of the object and the vehicle position can be improved.

Configuration 5

A vehicle position estimation device, which estimates a current vehicle position, comprising:
a control unit (21) configured by at least one processor, wherein
the control unit includes:
  a localization unit (F0) performing a process for specifying a position of a vehicle on a map based on (i) position information of a landmark detected based on an image frame captured by a front camera and (ii) position information of the landmark registered in the map; and
  an adverse environment determination unit (F6) determining whether a surrounding environment of the vehicle is an adverse environment based on at least one of (i) information output from a sensor equipped to the vehicle or (ii) information output from a communication device equipped to the vehicle, the adverse environment causing a deterioration in a performance of object recognition that is performed using the image frame;
the adverse environment determination unit determines a level of the adverse environment, and
the control unit (i) shortens an execution interval of the process for specifying the position of the vehicle or (ii) increases a deceleration request amount of traveling speed in response to an increase of the level of the adverse environment determined by the adverse environment determination unit.

Configuration 6

A traveling control device, which is mounted on a vehicle and automatically performing a speed control of the vehicle, comprising:
a control unit (21, 31) configured by at least one processor,
wherein
the control unit includes:
  a speed control unit (H1) outputting, to a traveling actuator (18) of the vehicle, a control signal that controls a traveling speed of the vehicle based on a detection result of a camera mounted to the vehicle;
  a localization unit (F0) specifying a position of the vehicle on a map based on (i) position information of a landmark specified based on an image frame captured by a front camera and (ii) position information of the landmark registered in the map; and
an adverse environment determination unit (F6) determining whether a surrounding environment of the vehicle is an adverse environment based on at least one of (i) information output from a sensor equipped to the vehicle or (ii) information output from a communication device equipped to the vehicle, the adverse environment causing a deterioration in an accuracy of object recognition that is performed using the image frame, and
the control unit restricts the traveling speed of the vehicle and outputs, via a notification device, a notification about restriction of the traveling speed of the vehicle in response to the adverse environment determination unit determining that the surrounding environment of the vehicle is the adverse environment.

What is claimed is:

1. A vehicle position estimation device mounted on a vehicle and estimating a current vehicle position, the vehicle position estimation device comprising
a control unit comprising at least one processor, wherein
the control unit includes:
a localization unit performing a process for specifying a position of the vehicle on a map based on (i) position information of a landmark detected based on an image frame captured by a front camera and (ii) position information of the landmark registered in the map; and
an adverse environment determination unit determining whether a surrounding environment of the vehicle is an adverse environment based on at least one of (i) information output from a sensor equipped to the vehicle or (ii) information output from a communication device equipped to the vehicle, the adverse environment causing a deterioration in an accuracy of object recognition that is performed using the image frame,
when it is determined that the surrounding environment is an adverse environment, the control unit generates a deceleration request signal to restrict the traveling speed of the vehicle,
when the vehicle does not travel in an overtaking lane or an acceleration lane, the control unit outputs, to a vehicle control module that automatically controls a traveling speed of the vehicle, the deceleration request signal to restrict the traveling speed of the vehicle in response to the adverse environment determination unit determining that the surrounding environment of the vehicle is the adverse environment, and
when the vehicle travels in an overtaking lane or an acceleration lane, the control unit cancels output of the deceleration request signal in response to the adverse environment determination unit determining that the surrounding environment of the vehicle is the adverse environment,
wherein
the control unit controls the vehicle to decelerate the vehicle and restrict the traveling speed of the vehicle.

2. The vehicle position estimation device according to claim 1, wherein
the control unit further includes a recognition accuracy evaluation unit that evaluates a recognition accuracy of the landmark based on the image frame, and
in response to the adverse environment determination unit determining that the surrounding environment of the vehicle is the adverse environment, the control unit repeatedly outputs, to the vehicle control module, a signal that requests a decrease of target speed set value used for speed control by a predetermined amount, as the deceleration request signal, when the recognition accuracy is below a predetermined allowable level in subsequent image frames captured by the front camera.

3. The vehicle position estimation device according to claim 1, wherein,
when the vehicle travels in the overtaking lane, the control unit outputs, to the vehicle control module, a signal that requests the vehicle to move from the overtaking lane to a traveling lane in response to the adverse environment determination unit determining that the surrounding environment of the vehicle is the adverse environment.

4. The vehicle position estimation device according to claim 1, wherein
the localization unit changes a determination whether to use detection results from a millimeter wave radar in the process for specifying the position of the vehicle in response to the adverse environment determination unit determining that the surrounding environment of the vehicle is the adverse environment.

5. The vehicle position estimation device according to claim 4, wherein
the localization unit changes the image frame used in the process for specifying the position of the vehicle in response to the adverse environment determination unit determining that the surrounding environment of the vehicle is the adverse environment.

6. The vehicle position estimation device according to claim 5, wherein
the front camera includes multiple different types of camera elements, which are equipped to the vehicle and have different view angles from one another, and
in response to the adverse environment determination unit determining that the surrounding environment of the vehicle is the adverse environment, the localization unit changes a combination of the camera elements, each of which corresponds to a generation source of the image frame used in the process for specifying the position of the vehicle.

7. The vehicle position estimation device according to claim 5, wherein
the front camera sequentially generates multiple types of image frames, which include a landmark detection purpose frame and a different use purpose frame,
the landmark detection purpose frame is an image frame in which the landmark is captured with an exposure time suitable for detection of the landmark,
the different use purpose frame is an image frame in which a different object is captured with an exposure time suitable for detection of the different object, and
the localization unit:
executes the process for specifying the position of the vehicle using the landmark detection purpose frame when the adverse environment determination unit determines that the surrounding environment of the vehicle is not the adverse environment; and
executes the process for specifying the position of the vehicle using the landmark detection purpose frame and the different use purpose frame when the adverse environment determination unit determines that the surrounding environment of the vehicle is the adverse environment.

8. The vehicle position estimation device according to claim 1, wherein
the adverse environment determination unit determines a level of the adverse environment,
the control unit changes a content of a process to be executed corresponding to the level of the adverse environment determined by the adverse environment determination unit,
wherein
changing of the content of the process to be executed comprises the control unit outputting, to a vehicle control module that automatically controls a traveling speed of the vehicle, a deceleration request signal to restrict the traveling speed of the vehicle in response to the adverse environment determination unit determining that the surrounding environment of the vehicle is the adverse environment, and a deceleration amount requested by the deceleration request signal is set to be increased with an increase in the level of the adverse environment.

9. The vehicle position estimation device according to claim 1, wherein
the adverse environment determination unit determines a type of the adverse environment, and
the control unit changes a content of a process to be executed corresponding to the type of the adverse environment determined by the adverse environment determination unit,
wherein
changing of the content of the process to be executed comprises the control unit outputting, to a vehicle control module that automatically controls a traveling speed of the vehicle, a deceleration request signal to restrict the traveling speed of the vehicle in response to the adverse environment determination unit determining that the surrounding environment of the vehicle is the adverse environment,
the adverse environment determination unit determines the type of the adverse environment as one of fog, afternoon sun, or heavy rain, and
when the type of the adverse environment is determined as the heavy rain, the control unit increases a deceleration amount requested by the deceleration request signal compared with a deceleration amount requested by the deceleration request signal when the type of the adverse environment is determined as the afternoon sun.

10. The vehicle position estimation device according to claim 1, wherein
the control unit calculates an effective recognition distance indicating a distance range within which the landmark is actually recognized in the image frame, and
the adverse environment determination unit determines that the surrounding environment of the vehicle is the adverse environment in response to the effective recognition distance decreasing to a value equal to or less than a predetermined threshold.

11. A vehicle position estimation device mounted on a vehicle and estimating a current vehicle position, the vehicle position estimation device comprising:
a control unit comprising at least one processor,
wherein
the control unit includes:
a localization unit performing a process for specifying a position of the vehicle on a map based on (i) position information of a landmark detected based on an image frame captured by a front camera and (ii) position information of the landmark registered in the map; and
an adverse environment determination unit determining whether a surrounding environment of the vehicle is an adverse environment based on at least one of (i) information output from a sensor equipped to the vehicle or (ii) information output from a communication device equipped to the vehicle, the adverse environment causing a deterioration in an accuracy of object recognition that is performed using the image frame,
when the vehicle travels in an overtaking lane, the control unit outputs, to a vehicle control module that automatically controls a traveling speed of the vehicle, a signal that requests the vehicle to move from the overtaking lane to a traveling lane in response to the adverse environment determination unit determining that the surrounding environment of the vehicle is the adverse environment,
wherein
the control unit controls the vehicle to decelerate the vehicle and restrict the traveling speed of the vehicle.

12. The vehicle position estimation device according to claim 11, wherein,
when the vehicle travels in an overtaking lane, in response to the adverse environment determination unit determining that the surrounding environment of the vehicle is the adverse environment, the control unit displays, on a display device, an overtake stop notification image, which notifies a movement of the vehicle from the overtaking lane to the traveling lane, and then outputs, to the vehicle control module, the signal that requests the vehicle to move from the overtaking lane to the traveling lane, and
when an operation is made by a user on the overtake stop notification image within a predetermined period from a display start time of the overtake stop notification image, the control unit determines whether to output, to the vehicle control module, the signal that requests the vehicle to move from the overtaking lane to the traveling lane.

13. The vehicle position estimation device according to claim 1, wherein,
in a state where the vehicle control module restricts the traveling speed of the vehicle, in response to the adverse environment determination unit determining that the surrounding environment of the vehicle is the adverse environment, the control unit outputs, to the vehicle control module, a speed recovery permission signal that permits cancellation of traveling speed restriction in response to the adverse environment determination unit determining that the surrounding environment of the vehicle is no longer the adverse environment.

14. The vehicle position estimation device according to claim 13, wherein
the control unit determines whether an acceleration suspension factor exists in front of the vehicle based on (i) a signal output from the front camera and (ii) information about a traveling environment in front of the vehicle indicated by the map, and
the control unit cancels output of the speed recovery permission signal when determining that the acceleration suspension factor exists in front of the vehicle.

15. A vehicle position estimation device mounted on a vehicle and estimating a current vehicle position, the vehicle position estimation device comprising:
a control unit comprising at least one processor,
wherein
the control unit includes:
a localization unit performing a process for specifying a position of the vehicle on a map based on (i) position information of a landmark detected based on an image frame captured by a front camera and (ii) position information of the landmark registered in the map; and
an adverse environment determination unit determining whether a surrounding environment of the vehicle is an adverse environment based on at least one of (i) information output from a sensor equipped to the vehicle or (ii) information output from a communication device equipped to the vehicle, the adverse environment causing a deterioration in an accuracy of object recognition that is performed using the image frame, the control unit outputs, to a vehicle control module that automatically controls a traveling speed of the vehicle, a deceleration request signal to restrict the traveling speed of the vehicle in response to the adverse environment determination unit determining that the surrounding environment of the vehicle is the adverse environment, the control unit determines whether an acceleration suspension factor exists in front of the vehicle based on (i) a signal output from the front camera and (ii) information about a traveling environment in front of the vehicle indicated by the map, in a state where the vehicle control module restricts the traveling speed of the vehicle in response to the adverse environment determination unit determining that the surrounding environment of the vehicle is the adverse environment, the control unit outputs, to the vehicle control module, a speed recovery permission signal that permits cancellation of traveling speed restriction in response to (i) the adverse environment determination unit determining that the surrounding environment of the vehicle is no longer the adverse environment and (ii) the control unit determining no acceleration suspension factor exists in front of the vehicle, and in a state where the vehicle control module restricts the traveling speed of the vehicle in response to the adverse environment determination unit determining that the surrounding environment of the vehicle is the adverse environment, the control unit does not output, to the vehicle control module, the speed recovery permission signal that permits cancellation of traveling speed restriction in response to (i) the adverse environment determination unit determining that the surrounding environment of the vehicle is no longer the adverse environment but (ii) the control unit determining the acceleration suspension factor exists in front of the vehicle, wherein
the control unit further includes a notification processing unit that performs, via a notification device, a notification about restriction of the traveling speed of the vehicle when the traveling speed of the vehicle is restricted in response to the adverse environment determination unit determining that the surrounding environment of the vehicle is the adverse environment, and wherein
the control unit controls the vehicle to decelerate the vehicle and restrict the traveling speed of the vehicle.

16. A vehicle position estimation device mounted on a vehicle and estimating a current vehicle position, the vehicle position estimation device comprising:

a control unit comprising at least one processor, wherein the control unit includes:
a localization unit performing a process for specifying a position of the vehicle on a map based on (i) position information of a landmark detected based on an image frame captured by a front camera and (ii) position information of the landmark registered in the map;
an adverse environment determination unit determining whether a surrounding environment of the vehicle is an adverse environment based on at least one of (i) information output from a sensor equipped to the vehicle or (ii) information output from a communication device equipped to the vehicle, the adverse environment causing a deterioration in an accuracy of object recognition that is performed using the image frame; and
a notification processing unit that performs, via a notification device, a notification to a user, the control unit outputs, to a vehicle control module that automatically controls a traveling speed of the vehicle, a deceleration request signal to restrict the traveling speed of the vehicle in response to the adverse environment determination unit determining that the surrounding environment of the vehicle is the adverse environment, and the notification processing unit performs the notification about restriction of the traveling speed of the vehicle when the traveling speed of the vehicle is restricted in response to the adverse environment determination unit determining that the surrounding environment of the vehicle is the adverse environment, wherein the localization unit shortens an execution interval of the process for specifying the position of the vehicle in response to the adverse environment determination unit determining that the surrounding environment of the vehicle is the adverse environment, and wherein
the control unit controls the vehicle to decelerate the vehicle and restrict the traveling speed of the vehicle.

17. The vehicle position estimation device according to claim 16, wherein
the notification about restriction of the traveling speed of the vehicle includes display of a deceleration notification image on a display device, and
the deceleration notification image includes at least one of a deceleration amount, a deceleration reason, or an estimated period for maintaining a deceleration state.

18. A traveling control device mounted on a vehicle and automatically performing a speed control of the vehicle, the traveling control device comprising a control unit comprising at least one processor, wherein the control unit includes:
a speed control unit outputting, to a traveling actuator of the vehicle, a control signal that controls a traveling speed of the vehicle;
a localization unit specifying a position of the vehicle on a map based on (i) position information of a landmark specified based on an image frame generated by a front camera and (ii) position information of the landmark registered in the map; and
an adverse environment determination unit determining whether a surrounding environment of the vehicle is an adverse environment based on at least one of (i) information output from a sensor equipped to the vehicle or (ii) information output from a communication device equipped to the vehicle, the adverse environment causing a deterioration in an accuracy of object recognition that is performed using the image frame, when the vehicle does not travel in an overtaking lane, the control unit executes a process to restrict a traveling speed of the vehicle in response to the adverse environment determination unit determining that the surrounding environment of the vehicle is the adverse environment, and when the vehicle travels in the overtaking lane, the control unit starts a process that controls the vehicle to cancel overtaking and move from the overtaking lane to a traveling lane.

* * * * *